(12) United States Patent
Ortiz et al.

(10) Patent No.: US 7,812,856 B2
(45) Date of Patent: *Oct. 12, 2010

(54) PROVIDING MULTIPLE PERSPECTIVES OF A VENUE ACTIVITY TO ELECTRONIC WIRELESS HAND HELD DEVICES

(75) Inventors: Luis M. Ortiz, Dallas, TX (US); Kermit D. Lopez, Dallas, TX (US)

(73) Assignee: Front Row Technologies, LLC, Albuquerque, NM (US)

( * ) Notice: Subject to any disclaimer, the term of this patent is extended or adjusted under 35 U.S.C. 154(b) by 887 days.

This patent is subject to a terminal disclaimer.

(21) Appl. No.: 09/902,348

(22) Filed: Jul. 10, 2001

(65) Prior Publication Data

US 2002/0063799 A1 May 30, 2002

Related U.S. Application Data

(60) Provisional application No. 60/243,561, filed on Oct. 26, 2000.

(51) Int. Cl.
*H04N 7/18* (2006.01)
(52) U.S. Cl. .................................................. 348/159
(58) Field of Classification Search ................ 248/157, 248/158, 159
See application file for complete search history.

(56) References Cited

U.S. PATENT DOCUMENTS

| | | | |
|---|---|---|---|
| 4,183,056 A | 1/1980 | Evans et al. | |
| 4,443,387 A | 4/1984 | Gordon | |

(Continued)

FOREIGN PATENT DOCUMENTS

CA 2237939 C 9/1999

OTHER PUBLICATIONS

Richard Alm, "New Arena a Technical Marvel," The Dallas Morning News, Oct. 15, 2000, pp. 1-6.

(Continued)

*Primary Examiner*—Nhon T Diep
(74) *Attorney, Agent, or Firm*—Kermit D. Lopez; Luis M. Ortiz; Ortiz & Lopez, PLLC

(57) ABSTRACT

Methods and systems for providing multiple perspectives of a venue activity to electronic hand held devices are disclosed. A system for providing venue-based data to venue-based wireless hand held device can include at least one processor for processing data captured by at least one venue-based video camera for transmission to remote wireless hand held devices and at least one transmitter for wirelessly transmitting the data to a the remote wireless hand held devices. Wireless hand held devices include a display screen for displaying received venue video data. A method for transmitting venue-based data to hand held devices includes steps of capturing video images from at least one perspective of a venue-based activity using at least one video camera, processing the video images into venue-based data formatted for transmission and use by at least one hand held device and transmitting the venue-based data to at least one hand held device. Hand held devices receive venue-based data, process the data for display on a display screen associated with hand held devices, and display processed data on the display screen, thereby enabling users of the hand held devices to view at least one perspective of venue-based data through the hand held devices.

20 Claims, 18 Drawing Sheets

U.S. PATENT DOCUMENTS

| | | | |
|---|---|---|---|
| 4,994,909 A | 2/1991 | Graves et al. | |
| 5,164,827 A | 11/1992 | Paff | |
| 5,295,180 A | 3/1994 | Vendetti et al. | |
| 5,413,345 A | 5/1995 | Nauck | |
| 5,422,816 A | 6/1995 | Sprague et al. | |
| 5,448,291 A | 9/1995 | Wickline | 348/159 |
| 5,448,726 A | 9/1995 | Vance et al. | 358/86 |
| 5,485,504 A | 1/1996 | Ohnsorge | 379/58 |
| 5,513,384 A * | 4/1996 | Brennan et al. | 455/180.1 |
| 5,546,538 A | 8/1996 | Cobbley et al. | |
| 5,585,850 A | 12/1996 | Schwaller | 348/388 |
| 5,598,208 A * | 1/1997 | McClintock | 348/159 |
| 5,600,368 A | 2/1997 | Matthews et al. | 348/143 |
| 5,613,191 A | 3/1997 | Hylton et al. | 455/3.1 |
| 5,627,915 A | 5/1997 | Rosser et al. | 382/219 |
| 5,663,717 A | 9/1997 | DeLuca | |
| 5,689,549 A * | 11/1997 | Bertocci et al. | 455/463 |
| 5,708,961 A | 1/1998 | Hylton et al. | 455/4.2 |
| 5,726,660 A | 3/1998 | Purdy et al. | |
| 5,729,471 A * | 3/1998 | Jain et al. | 725/131 |
| 5,758,088 A | 5/1998 | Bezaire et al. | |
| 5,760,824 A | 6/1998 | Hicks, III | 348/14 |
| 5,760,848 A | 6/1998 | Cho | |
| 5,768,151 A | 6/1998 | Lowy et al. | |
| 5,793,416 A | 8/1998 | Rostoker et al. | 348/17 |
| 5,797,089 A | 8/1998 | Nguyen | |
| 5,806,005 A | 9/1998 | Hull et al. | 455/566 |
| 5,808,695 A | 9/1998 | Rosser et al. | 348/584 |
| 5,812,819 A | 9/1998 | Rodwin et al. | |
| 5,822,324 A | 10/1998 | Kostresti et al. | |
| 5,841,122 A | 11/1998 | Kirchhoff | 235/492 |
| 5,847,612 A | 12/1998 | Birleson | 331/2 |
| 5,847,762 A | 12/1998 | Canfield et al. | 348/415 |
| 5,878,211 A * | 3/1999 | Delagrange et al. | 726/34 |
| 5,892,554 A | 4/1999 | DiCicco et al. | 348/584 |
| 5,894,320 A | 4/1999 | Vancelette | 348/7 |
| 5,920,701 A * | 7/1999 | Miller et al. | 709/228 |
| 5,933,773 A * | 8/1999 | Barvesten | 455/411 |
| 5,946,635 A | 8/1999 | Dominguez | |
| D413,881 S | 9/1999 | Ida et al. | |
| 5,953,056 A | 9/1999 | Tucker | |
| 5,953,076 A | 9/1999 | Astle et al. | 348/584 |
| 5,959,539 A | 9/1999 | Adolph et al. | |
| 5,979,757 A | 11/1999 | Tracy et al. | |
| 5,982,445 A | 11/1999 | Eyer et al. | 348/461 |
| 5,990,958 A | 11/1999 | Bheda et al. | 348/407 |
| 5,991,498 A | 11/1999 | Young | |
| 5,999,808 A | 12/1999 | LaDue | 455/412 |
| 6,002,720 A | 12/1999 | Yurt et al. | 375/240 |
| 6,002,995 A | 12/1999 | Suzuki et al. | 702/188 |
| 6,009,336 A | 12/1999 | Harris et al. | 455/566 |
| 6,016,348 A | 1/2000 | Blatter et al. | 380/5 |
| 6,034,621 A | 3/2000 | Kaufman | |
| 6,034,716 A | 3/2000 | Whiting et al. | 348/36 |
| 6,043,837 A | 3/2000 | Driscoll, Jr. et al. | 348/36 |
| 6,064,860 A | 5/2000 | Ogden | 455/66 |
| D426,527 S | 6/2000 | Sakaguchi | D14/126 |
| 6,073,171 A * | 6/2000 | Gaughan et al. | 725/110 |
| 6,078,954 A | 6/2000 | Lakey et al. | 709/223 |
| 6,095,423 A | 8/2000 | Houdeau et al. | 235/487 |
| 6,100,925 A | 8/2000 | Rosser et al. | 348/169 |
| 6,104,414 A | 8/2000 | Odryna et al. | 345/909 |
| 6,121,966 A | 9/2000 | Teodosio et al. | 345/346 |
| 6,124,862 A | 9/2000 | Boyken et al. | 345/435 |
| 6,128,143 A | 10/2000 | Nalwa | 359/725 |
| 6,131,025 A | 10/2000 | Riley et al. | 455/414 |
| 6,133,946 A | 10/2000 | Cavallaro et al. | 348/135 |
| 6,137,525 A | 10/2000 | Lee et al. | 348/14 |
| 6,144,402 A | 11/2000 | Norsworthy et al. | |
| 6,144,702 A | 11/2000 | Yurt et al. | |
| 6,154,250 A | 11/2000 | Honey et al. | |
| 6,167,092 A | 12/2000 | Lengwehasatit | |
| 6,169,568 B1 | 1/2001 | Shigetomi | |
| 6,192,257 B1 | 2/2001 | Ray | 455/566 |
| 6,204,843 B1 | 3/2001 | Freeman et al. | |
| 6,215,484 B1 | 4/2001 | Freeman et al. | |
| 6,222,937 B1 | 4/2001 | Cohen et al. | |
| 6,227,974 B1 | 5/2001 | Eilat et al. | |
| 6,252,586 B1 | 6/2001 | Freeman et al. | |
| 6,256,019 B1 | 7/2001 | Allport | |
| 6,269,483 B1 | 7/2001 | Broussard | |
| 6,271,752 B1 * | 8/2001 | Vaios | 340/541 |
| 6,289,464 B1 * | 9/2001 | Wecker et al. | 713/300 |
| 6,295,094 B1 | 9/2001 | Cuccia | |
| 6,317,039 B1 | 11/2001 | Thomason | |
| 6,317,776 B1 | 11/2001 | Broussard et al. | |
| 6,400,264 B1 * | 6/2002 | Hsieh | 340/506 |
| 6,405,371 B1 | 6/2002 | Oosterhout et al. | |
| 6,424,369 B1 | 7/2002 | Adair et al. | |
| 6,434,403 B1 * | 8/2002 | Ausems et al. | 455/556.2 |
| 6,434,530 B1 | 8/2002 | Sloane et al. | |
| 6,442,637 B1 | 8/2002 | Hawkins et al. | |
| 6,456,334 B1 | 9/2002 | Duhault | |
| 6,466,202 B1 | 10/2002 | Suso et al. | 345/169 |
| 6,522,352 B1 | 2/2003 | Strandwitz et al. | 348/211.2 |
| 6,525,762 B1 | 2/2003 | Mileski et al. | 348/81 |
| 6,526,335 B1 * | 2/2003 | Treyz et al. | 701/1 |
| 6,535,493 B1 | 3/2003 | Lee et al. | 370/329 |
| 6,549,624 B1 | 4/2003 | Sandru | |
| 6,560,443 B1 | 5/2003 | Vaisanen et al. | |
| 6,564,070 B1 | 5/2003 | Nagamine et al. | 455/556 |
| 6,570,889 B1 | 5/2003 | Stirling-Gallacher et al. | 370/479 |
| 6,578,203 B1 * | 6/2003 | Anderson et al. | 725/141 |
| 6,579,203 B2 | 6/2003 | Wang et al. | |
| 6,602,191 B2 | 8/2003 | Quy | |
| 6,608,633 B1 | 8/2003 | Sciammarella et al. | |
| 6,624,846 B1 | 9/2003 | Lassiter | |
| 6,647,015 B2 | 11/2003 | Malkemes et al. | |
| 6,657,654 B2 | 12/2003 | Narayanaswami | |
| 6,669,346 B2 | 12/2003 | Metcalf | |
| 6,675,386 B1 * | 1/2004 | Hendricks et al. | 725/105 |
| 6,681,398 B1 | 1/2004 | Verna | |
| 6,714,797 B1 | 3/2004 | Rautila | |
| 6,728,518 B1 * | 4/2004 | Scrivens et al. | 455/90.2 |
| 6,731,940 B1 * | 5/2004 | Nagendran | 455/456.1 |
| 6,754,509 B1 | 6/2004 | Khan et al. | |
| 6,757,262 B1 | 6/2004 | Weisshaar et al. | |
| 6,766,036 B1 | 7/2004 | Pryor | |
| 6,782,102 B2 * | 8/2004 | Blanchard et al. | 380/270 |
| 6,813,608 B1 * | 11/2004 | Baranowski | 705/6 |
| 6,819,354 B1 | 11/2004 | Foster et al. | |
| 6,912,513 B1 | 6/2005 | Candelore | |
| 6,931,290 B2 | 8/2005 | Forest | |
| 6,934,510 B2 | 8/2005 | Katayama | |
| 6,970,183 B1 * | 11/2005 | Monroe | 348/143 |
| 6,986,155 B1 | 1/2006 | Courtney et al. | |
| 7,124,425 B1 * | 10/2006 | Anderson et al. | 725/68 |
| 7,149,549 B1 * | 12/2006 | Ortiz et al. | 455/566 |
| 7,162,532 B2 * | 1/2007 | Koehler et al. | 709/231 |
| 7,196,722 B2 | 3/2007 | White et al. | |
| 7,376,388 B2 * | 5/2008 | Ortiz et al. | 455/3.06 |
| 2001/0040671 A1 | 11/2001 | Metcalf | |
| 2001/0042105 A1 * | 11/2001 | Koehler et al. | 709/217 |
| 2001/0045978 A1 * | 11/2001 | McConnell et al. | 348/42 |
| 2002/0018124 A1 | 2/2002 | Mottur et al. | |
| 2002/0058499 A1 | 5/2002 | Ortiz | |
| 2002/0069419 A1 * | 6/2002 | Raverdy et al. | 725/87 |
| 2002/0115454 A1 | 8/2002 | Hardacker | |
| 2002/0186668 A1 | 12/2002 | Thomason | |
| 2002/0188943 A1 | 12/2002 | Freeman et al. | |
| 2003/0041334 A1 | 2/2003 | Lu | |
| 2003/0046108 A1 | 3/2003 | Labadie | |
| 2003/0105845 A1 | 6/2003 | Leermakers | |

| | | |
|---|---|---|
| 2005/0046698 A1 | 3/2005 | Knight |
| 2005/0060751 A1 | 3/2005 | Glaser |
| 2006/0170778 A1 | 8/2006 | Ely et al. |
| 2007/0129817 A1 | 6/2007 | Cadiz et al. |
| 2007/0275746 A1 | 11/2007 | Bitran |

OTHER PUBLICATIONS

"ChoiceSeat, Live Interactive Event Entertainment," www.choiceseat.com, Oct. 15, 2000, pp. 1-5.

"Unstrung: The Birth of the Wireless Internet," CIBC World Markets, Equity Research, Oct. 4, 2000, pp. 1-140.

Brian Bergstein, "Click Me Out to the Ballgame, Web-Wired Stadiums Aim to Spur Evolution of Spectator Sports," Las Vegas Review Journal, Online Edition, Oct. 20, 2000, pp. 1-4.

Stephanie Sanborn, "Armchair Quarterbacks go Wireless at 3Com Park"; InfoWorld, Sep. 29, 2000, pp. 1-2.

"Peanuts, popcorn and a PC at the old ballpark," www.king5.com, Sep. 28, 2000, pp. 1-4.

Brigan Bergstein, "Having a Ball with Technology, High-Tech Firms Teaming up with Pro Sports Venues," www.abcnews.com, Sep. 27, 2000, pp. 1-2.

Wu et al., "On End-to-End Architecture for Transporting MPEG-4 Video over the Internet"; IEEE Transactions on Circuits and Systems for Video Technology, vol. 10, No. 6, pp. 1-18, Sep. 2000.

"3Com: Don't Get Up, Sports Fans," USA Today, Tech Report, Aug. 22, 2000, pp. 1-2.

Scott Boyter, "Product likely to be home run with sports fans," DFW TechBiz, Aug. 21, 2000, pp. 1-3.

David Carnoy, "LG TP3000"; CNET Wireless, Aug. 17, 2000, pp. 1-2.

"SGI at the Pepsi Center"; Silicon Graphics, Inc.; Jul. 2000, pp. 1-2.

"Wireless Dimensions Corporation Adds to Mobile-Venue Suite™"; Press Release, Wireless Dimensions; Allen, Texas; Jul. 26, 2000; http://www.wirelessdimensions.net/news.html, pp. 1-2.

"Wireless Demensions Corporation Unveils Mobile-Venue Suite™"; Press Release, Wireless Dimensions; Allen, Texas; Jun. 19, 2000; http://www.wirelessdimensions.net/news.html, pp. 2-3.

"Contactless Applications for PDAs"; Inside Technologies, Cartes 2000, Aug. 2000, pp. 1-14.

"Seeing is Believing—Motorola and Packetvideo Demonstrate MPEG-4 Video over GPRS," Press Release, Packetvideo, May 10, 2000, pp. 1-3.

"IEEE 802.116 Wireless LANs," 3COM Technical Paper, Apr. 25, 2000, pp. 1-3, pp. 1-13.

Capin et al., "Efficient Modeling of Virtual Humans in MPEG-4"; 0-7803-6536-4/00, IEEE 2000, pp. 1-4.

W.A. Adamson et al., "Secure Distributed Virtual Conferencing: Multicast or Bust"; CITI Technical Report 99-1, Center for Information Technology Integration, University of Michigan, Ann Arbor, Jan. 25, 1999, pp. 1-7.

N.T. Trask et al., "Smart Cards in Electronic Commerce"; BT Technol J. vol. 17, No. 3, Jul. 1999, pp. 57-66.

Battista et al., "MPEG-4: A Multimedia Standard for the Third Millenium, Part 1"; 1070-986X/99, IEEE 1999, pp. 74-83.

"Fiber Optic Video/Audio/Intercom/Data System," Telecast Fiber Systems, Inc., pp. 1-4.

Thomas Lauterbach & Matthias Unbehaun, "Multimedia Environment for Mobiles (MEMO)—Interactive Multimedia Services to Portable and Mobile Terminals," Robert Bosch Multimedia-Systems GmbH & Co., KG., Hildesheim, Germany, 1997, pp. 1-6.

Salzberg: K. et al., "Intel's Immersive Sports Vision," Intel Corporation, March 30, 2001.

* cited by examiner

PROVIDING MULTIPLE PERSPECTIVES OF A VENUE ACTIVITY TO ELECTRONIC WIRELESS HAND HELD DEVICES

CROSS-REFERENCE TO RELATED APPLICATIONS

This application claims the benefit of U.S. Provisional Application Ser. No. 60/243,561, filed Oct. 26, 2000 by Luis M. Ortiz and Kermit D. Lopez, for "Providing Multiple Perspectives for a Venue Activity through an Electronic Hand Held Device."

BACKGROUND OF THE INVENTION

1. Technical Field of the Invention

The present invention is related to wireless electronic hand held devices, such as Personal Digital Assistants (PDAs), hand held televisions, and data-enabled wireless telephones. The present invention also relates to techniques for remotely delivering video-related data to hand held devices. In addition, the present invention relates to techniques for providing increased viewing opportunities for audiences in venue environments, such as stadiums and concert arenas. Additionally, the present invention relates to wireless video data transmission to hand held devices.

2. Description of the Related Art

Most modern stadiums and live entertainment facilities or arenas (herein also collectively referred to as "venues"), which feature sporting events and concerts, typically employ large television screens that receive video images and are linked within the stadium to a plurality of television cameras positioned to capture video images at diverse locations within the stadium. The audience at a typical sporting event, for example, can generally view advertisements, instant replays, and other sports related data on the large television screens within the sports stadium itself. Feeds are additionally generally provided from the cameras to announcers in a broadcast booth, replaying certain plays from the event so that announcers can make comments about plays, and finally transmitting a telecast to the viewing audience, including some aspects of captured video and data to the stadium audience.

Despite the availability of such large screen television monitors, venue event audience members still lack enhanced viewing options or perspectives within the venue itself. To compensate for the lack of viewing options, sports and concert promoters often rent binoculars to audience members prior to or during the event. Such binoculars can permit the typical audience member to obtain a somewhat better, but limited, view of the event, such as a football or hockey game, but even these views are often obstructed by other audience members and are tied to only one perspective.

The large television screens placed in a venue such as a stadium are typically linked to cameras that are fixed or mobile. Placement of cameras about the stadium is generally tied to an enterprise system. The movement of the game ball in a football game, for example, along with the players on the field is dynamic and unpredictable, and may not always be caught by the active camera having the best perspective. Thus, during a game, the large television screens typically provide only one view, which can be further obstructed by other players or officials, often destroying a critical angular view.

In addition, such large screens are often utilized to bombard audience members with information, such as advertisements, thereby cutting into venue activity video that venue audience members might otherwise wish to view such as instant replays, a current play or other event data. The audience members, therefore, essentially view the large screen at the behest of the camera operator or director and cannot select their own views or camera angles.

Based on the foregoing, the present inventors have found that such limitations in venue environments can be solved through the use of hand held devices, such as PDAs, hand held televisions, data/video-enabled cellular telephones, and other hand held wireless video-enabled devices. For example, the recent shift in the consumer electronics industry from an emphasis on analog technology to a preference for digital technology is largely based on the fact that the former generally limits the user to a role of a passive recipient of information, while the latter is interactive and allows the user to control what, when, and how he or she receives and manipulates certain information. This shift in focus has resulted in the development and increasingly widespread use of a digital device generically referred to as a "personal digital assistant" (PDA).

Hand held computing devices (i.e., hereinafter referred to as "hand held devices" or "handheld devices") are becoming increasingly popular for storing and maintaining information. Although PDAs may be connected to a desktop personal computer or other PDAs via infrared, direct wire, or wireless communication links, PDAs and similar hand held devices, can be linked to remote networks, such as the Internet, or local wireless resources, such as RF broadcasts, through available wireless communications techniques.

The most advanced data- and video-enabled wireless communication devices currently available in the marketplace take the form of a PDA (e.g., Palm Pilot™, Handspring Visor™, and Windows CE compatible hand held computers, such as the iPAQ™). Unlike personal computers, which are general-purpose devices geared toward refining and processing information, PDAs are designed to capture, store and display information originating from various sources. Additionally, while a certain level of skill is required to use a personal computer effectively, PDAs are designed with the novice and non-computer user in mind.

Attempts have been made to provide venue-based, interactive entertainment to enhance the fan experience at live events. Such attempts utilize touch-screen technology integrated directly into seats at outdoor or indoor arenas. Audience members, however, due to their integration with the viewer seat, can easily damage such devices. Systems that incorporate such devices are also expensive because they literally require miles of cable.

Some recently constructed arenas, for example, that implement such seat-integrated technology are requiring hundreds of miles of electronic cabling, including audiovisual, broadcast, and multiband lines. Such a plethora of large cables are expensive and require extra space, which often cannot be found in older stadiums, or would require a greater expense to integrate into newly built stadiums. The cost of retrofitting an older stadium with such technology can be staggering. Additionally, many fans that attend games or concerts with such technology integrated directly into the seats may find such a feature distracting.

Another problem faced by venue promoters and arena owners who integrate fixed technology directly into the seat is that such technology can quickly become obsolete. If a new facility is fitted with such electronic/hardware intensive technology, the technology may become quickly outdated, requiring an expensive update and/or retrofit.

The present inventors thus realize that a solution to these problems lies in the use of wireless hand held devices. By utilizing modern technology integrated with hand held devices, on-demand live action, multiple camera angles, instant replays, and real-time team and venue information may each be readily provided to fans without the expense and problems associated with present in-seat integrated technical environments. Additionally, it is anticipated that the deployment of venue-based systems facilitating the use of such devices would be relatively inexpensive, at least in comparison to seat-integrated systems. Finally, such systems will provide the venue attendee with increased mobility and freedom of use within and throughout the venue environment.

SUMMARY OF THE INVENTION

One aspect of the present invention provides improved methods and systems for delivering venue-related data to a hand held device.

It is another aspect of the present invention to provide improved methods and systems for delivering real time video provided at an entertainment venue to a hand held device.

It is still another aspect of the present invention to provide methods and systems for providing multiple perspectives from a venue activity for viewing through a hand held device.

It is yet another aspect of the present invention to provide hand held devices and associated methods that provide on-demand video action and instant replays from multiple camera angles focused on an entertainment venue activity.

It is still another aspect of the present invention to provide hand held devices and associated methods that provide on-demand video action and instant replays from one or more cameras focused on a venue activity.

The above and other aspects of the invention are achieved as will now be further described.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
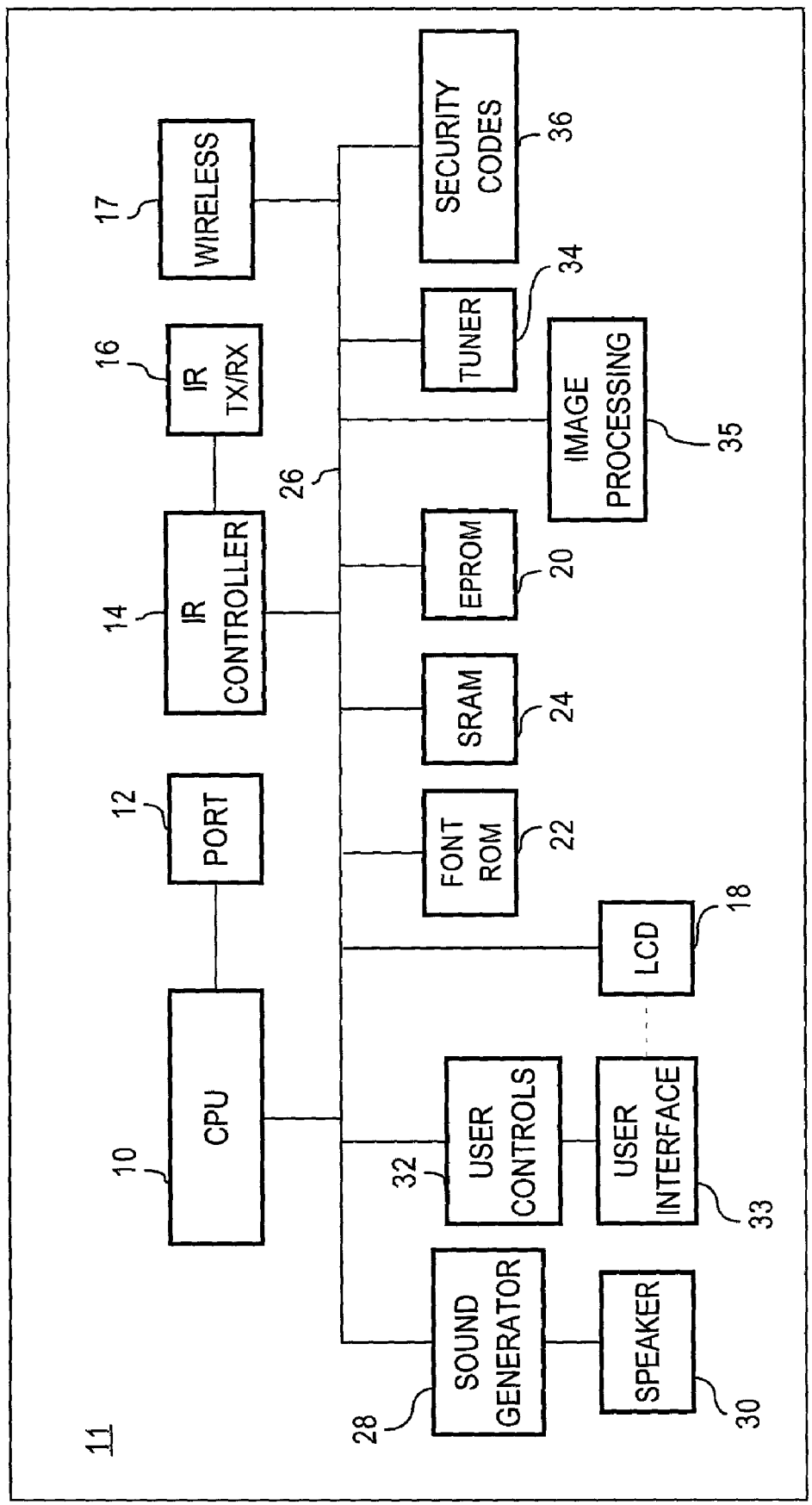
FIG. 1 depicts a block diagram illustrating components of a hand held device in which preferred embodiments of the present invention may be implemented.

FIG. 1 depicts a schematic diagram illustrating a general hardware configuration of a hand held device 11 in accordance with an embodiment of the present invention. Those skilled in the art can appreciate, however, that other hardware configurations with less or more hardware and/or modules may be utilized in carrying out the methods and systems (e.g., hand held device 11) of the present invention as further described herein. CPU 10 of hand held device 11 performs as a main controller operating under the control of operating clocks supplied from a clock oscillator. CPU 10 may be configured, for example, as a 16-bit microprocessor. External pins of CPU 10 are generally coupled to an internal bus 26 so that it may be interconnected to respective components.

A SRAM 24 can be configured as a writeable memory that does not require a refresh operation and can be generally utilized as a working area of CPU 10. SRAM (Static RAM) is generally a form of semiconductor memory (RAM) based on a logic circuit known as a flip-flop, which retains information as long as there is enough power to run the device. Font ROM 22 can be configured as a read only memory for storing character images (e.g., font) displayable on a display 18. Examples of types of displays that may be utilized in accordance with display 18 include a TFT active matrix display, an illuminated LCD (Liquid Crystal Display), or other small-scale displays being developed.

CPU 10 of the present embodiment drives display 18 utilizing, among other media, font images from Font ROM 22, and images transmitted as data through wireless unit 17 and processed by image-processing module 35. A EPROM 20 may be configured as a read only memory that is generally erasable under certain conditions and can be utilized for permanently storing control codes for operating respective hardware components and security data, such as a serial number.

Figure 3:
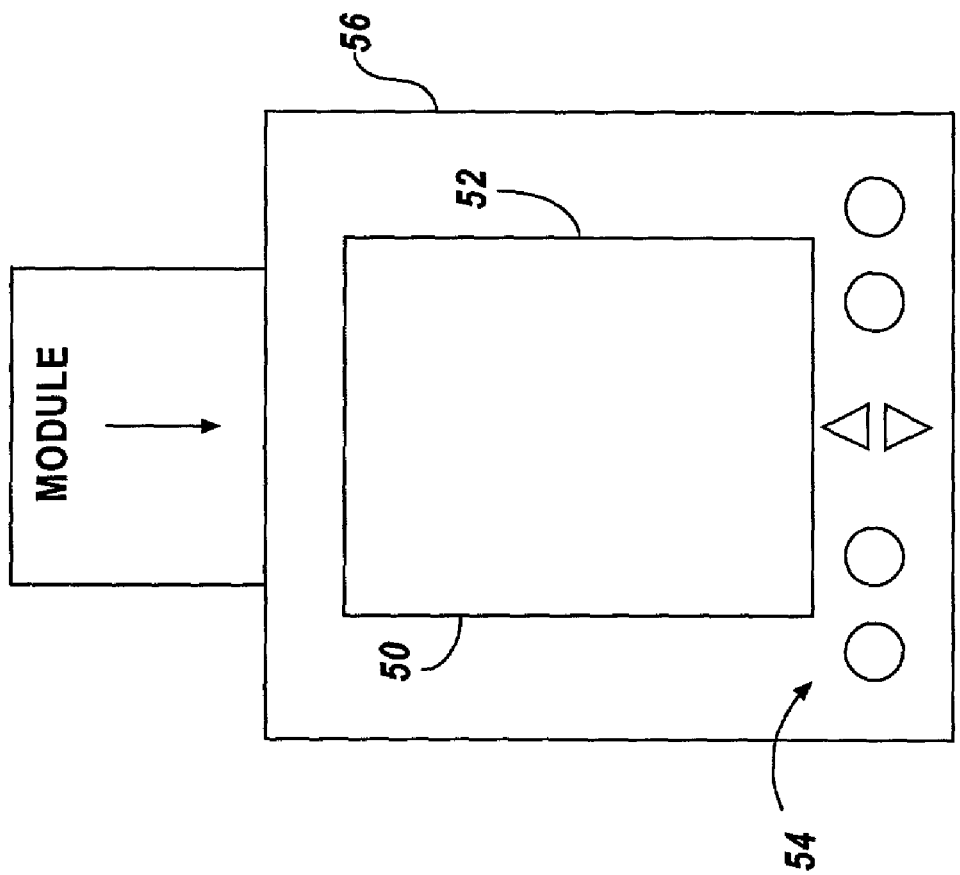
FIG. 3 depicts a pictorial representation of a hand held device adapted for receiving a module in accordance with preferred embodiments of the present invention.

An IR controller 14 can generally be configured as a dedicated controller for processing infrared codes transmitted/received by an IR transceiver 16 and for capturing the same as computer data. Wireless unit 17 can generally be configured as a dedicated controller and transceiver for processing wireless data transmitted from and to a wireless communications network. Note that wireless unit 17 can be implemented as a separate module or cartridge, such as illustrated in FIG. 3. Wireless unit 17 can thus comprise a wireless module.

Port 12 can be connected to CPU 10 and can be temporarily attached, for example, to a docking station to transmit information to and from hand held device 11 to other devices such as personal computers, retail cash registers, electronic kiosk devices, and so forth. Port 12 can also be configured, for example, to link with a modem, cradle or docking station, which are well known in the art, that permit network devices, a personal computer or other computing devices to communicate with hand held device 11.

User controls 32 permit a user to enter data to hand held device 11 and initiate particular processing operations via CPU 10. A user interface 33 may be linked to user controls 32 to permit a user to access and manipulate hand held device 11 for a particular purpose, such as, for example, viewing images on display 18. Those skilled in the art will appreciate that user interface 33 may be implemented as a touch screen user interface, as indicated by the dashed lines linking display 18 with user interface 33. In addition, CPU 10 may cause a sound generator 28 to generate sounds of predetermined frequencies from a speaker 30. Speaker 30 may be utilized to produce music and other audio information associated with video data transmitted to hand held device 11 form an outside source.

Those skilled in the art can appreciate that additional electronic circuits or the like other than, or in addition to, those illustrated in FIG. 1 may be used to construct hand held device 11. Such components, however, are not described in the present specification, because many aspects of them are well known in the art. For example, hand held televisions are available for receiving public television broadcasts, but the basic technology can be modified on such devices so that they may be adapted to (e.g., proper authentication, filters, security codes, or the like) receive venue-based RF transmissions from at least one venue-based RF source (e.g., a wireless camera, or data from a camera transmitted wirelessly through at least one transmitter). Those skilled in the art can thus appreciate that because of the brevity of the drawings described herein, only a portion of the connections between the illustrated hardware blocks is generally depicted. In addition, those skilled in the art will appreciate that hand held device 11 can be implemented as a specific type of a hand held device, such as a Personal Digital Assistant (PDA), paging device, WAP-enabled mobile phone, and other associated hand held computing devices well known in the art.

Given the teaching of various embodiments of the present invention, it should be appreciated that a hand held device 11 can be configured to permit images, similar to television broadcast images, to be displayed on display 18 for a user to view. Hand held device 35 thus includes an image-processing unit 35 for processing images transmitted as data to hand held device 11 through wireless unit 17. A tuner unit 34, implemented as either a single tuner or a plurality of tuners, may be linked through internal bus 26 to CPU 10. Additionally, a security unit 36 may be utilized to process proper security codes to thereby ensure that data transferred to and from hand held device 11 may be secure and/or permitted. Broadcast security prevents general receipt of venue images without proprietary hardware and/or signals.

Security unit 36 may be implemented as an optional feature of hand held device 11. Security unit 36 can also be configured with software, e.g., algorithm routines or subroutines, that are processed by CPU 10, and which prevent wireless data from being transmitted/received from hand held device 11 beyond a particular frequency range, outside of a particular geographical area associated with a local wireless network, or absent authorization codes (e.g., decryption, encryption, coding, decoding, and so forth). Note that security unit 36 can be implemented as a separate security module, such as, for example, a smart card, or cartridge. An example of a module, which may be implemented in accordance with the methods and systems of the present invention, is illustrated in FIG. 3. A security module of this type may be utilized for securing data transmitted from or to a hand held device such as, for example, hand held device 11.

Hand held device 11 can thus be configured with both wireless and wireline capabilities, depending on the needs and requirements of a manufacturer or customer. Such wireless capabilities include features such as those found in cellular telephone units, in accordance with carrying out embodiments of the present invention. Current examples of hand held devices that can be utilized in accordance with the methods and systems of the present invention include the "PalmPilot™" PDA, manufactured and sold by Palm Computing, the Handspring Visor™, Window CE™ compatible devices, RIM™ Blackberry-family paging devices, Motorola paging devices, hand held portable televisions, and the Symbol™ SPT-family of PDA-type organizer devices. Such hand held devices are mentioned herein for illustrative purposes only and are not considered limiting features of the present invention. Hand held devices which may also be implemented in accordance with the methods and systems of the present invention include hand held devices, such as cellular telephones having viewable display screens for the display of data transmitted through wireless networks. Customized, venue-specific devices (i.e., proprietary, limited use) may be also developed in accordance with the methods and systems of the present invention that incorporate hardware and software modules necessary to practice the methods and systems taught herein.

Those skilled in the art can appreciate that although hand held device 11 is generally illustrated in FIG. 1, hand held device 11 can be implemented as a wireless application protocol (WAP) web-enabled cellular hand held device, such as a PDA, wireless telephone, or pager or a combination thereof. Hand held device 11 can also be configured with features of combination cellular telephone/PDA devices. One recent example of such a device is the Handspring™ PDA and associated cellular phone attachment module, which is manufactured and sold by Handspring™ Inc. Other such devices include the Palm-Motorola phone, which permits users to access e-mail and store calendars and contact databases. Hand held devices may also be provided in the form of a multi-RF (Radio Frequency) receiver-enabled hand held television-viewing device, such as those manufactured by Sony™ and Casio™. Regardless of the type of hand held device implemented, it is anticipated that such hand held devices will be adapted to receive and process data via image-processing unit 35 for ultimate display as moving images on display unit 18, in accordance with the present invention. Image-processing unit 35 may include image-processing routines, subroutines, software modules, and so forth, to perform image-processing operations.

Figure 2:
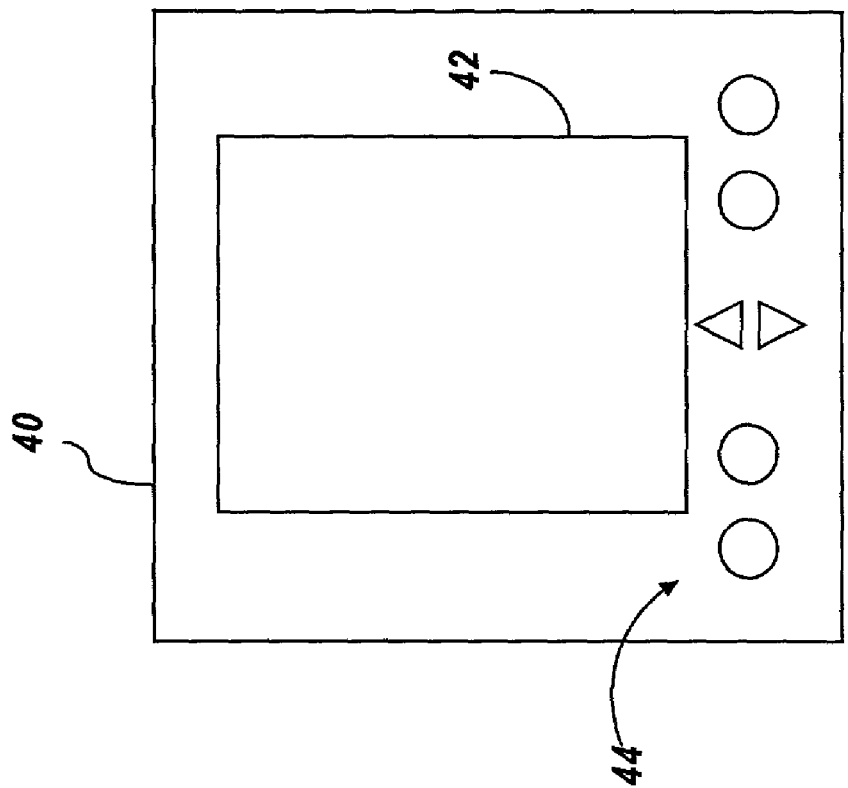
FIG. 2 illustrates a pictorial representation of a hand held device, which may be utilized to implement preferred embodiments of the present invention.

FIG. 2 illustrates a pictorial representation of a hand held device 40 that may be utilized to implement preferred embodiments of the present invention. Hand held device 40 includes a display screen 42, which is generally analogous to display 18 of FIG. 1. Television images broadcast via radio frequency or digital data may be displayed on display screen 42 for a user to view. User controls 44 can permit a user to select and/or manipulate images or text displayed on display screen 42. User controls 44 of FIG. 2 are generally analogous to user controls 32 of FIG. 1. A touch screen user interface may be further configured on the display screen 42 with hand held device 40 to permit a user to manipulate images/text displayed on display screen 42.

FIG. 3 depicts a pictorial representation of a hand held device 56 adapted for receiving a module 50, in accordance with preferred embodiments of the present invention. Although hand held device 56 of FIG. 3 is generally analogous to hand held device 40 of FIG. 2, the difference being that hand held device 56 may be adapted to receive a module/cartridge that permits hand held device 56 to function according to specific hardware, codes and/or instructions contained in a memory location (e.g., a computer chip or magnetic strip) within module 50. Module 50 can be configured as a smart card, well known in the art. Such a smart card may provide, for example, access codes (e.g., decryption) to enable hand held device 56 to receive venue broadcasts. Note that as utilized herein, the term "module" may refer to a physical module, such as a cartridge. The term "module" may also refer to a software module composed of routines or subroutines that perform a particular function. Those skilled in the art can appreciate the meaning of the term module is based on the context in which the term is utilized and environment being described. Thus, module 50 as illustrated can be generally configured as a physical cartridge or smart card. The term "module" as utilized herein may also refer to a software module, depending on the context of the discussion thereof.

To illustrate the use of a physical module, such as module 50, assume that a user may possess several such physical modules or cartridges. One module, when inserted into hand held device FIG. 3 may instruct hand held device 50 to function as a standard PDA, such as a Palm Pilot device. Another module, when inserted into hand held device FIG. 3, may instruct hand held device 56 to function as a portable television that receives wireless television broadcasts and/or data from a local wireless broadcast network and/or venue-based (e.g., short range) broadcasts. Such a module can also incorporate decryption capabilities to receive controlled/secured broadcasts at venues.

Those skilled in the art can thus appreciate that hand held device 56 can be adapted to receive and cooperate with module 50. Additionally, hand held device 56 includes a display screen 52 that is generally analogous to display screen 42 of FIG. 2 and display 18 of FIG. 1. Hand held device 56 also includes user controls 54 that are generally analogous to user controls 44 of FIG. 2 and user controls 32 of FIG. 1. Hand held device 56 of FIG. 3 is generally analogous to hand held device 11 of FIG. 1. Thus, hand held device 56 can also implement touch screen capabilities through a touch screen user interface integrated with display screen 52.

Assuming module 50 is implemented as a smart card instead of a cartridge to provide receiver and/or securing capabilities (e.g., encryption, decryption, coding, decoding, etc.), it is anticipated that similar features can be implemented in accordance with a smart card to insure that hand held device 56 includes touch screen user interface and video viewing capabilities. Smart cards are generally known in the art as credit card sized plastic cards with an embedded computer chip. The chip can either be a microprocessor with internal memory or a memory chip with non-programmable logic. The chip connection can be configured via direct physical contact or remotely through a contactless electromagnetic interface.

Smart cards may be generally configured as either a contact or contactless smart card, or a combination thereof. A contact smart card requires insertion into a smart card reader (e.g., contained within hand held device 56) with a direct connection to, for example, a conductive micromodule on the surface of the card. Such a micromodule may be generally gold plated. Transmission of commands, data, and card status takes place through such physical contact points.

A contactless card requires only close proximity to a reader. Both the reader and the card may be implemented with antenna means providing a contactless link that permits the devices to communicate with one another. Contactless cards can also maintain internal chip power or an electromagnetic signal (e.g., RF tagging technology). Two additional categories of smart codes, well known in the art, which are based on contact and contactless cards are the so-called Combi cards and Hybrid cards.

A Hybrid card generally may be equipped with two chips, each with a respective contact and contactless interface. The two chips are not connected, but for many applications, this Hybrid serves the needs of consumers and card issuers. The Combi card may be generally based on a single chip and can be generally configured with both a contact and contactless interface.

Chips utilized in such smart cards are generally based on microprocessor chips or memory chips. Smart cards based on memory chips depend on the security of the card reader for their processing and can be utilized when low to medium security requirements. A microprocessor chip can add, delete and otherwise manipulate information in its memory. Microprocessor-based memory cards typically contain microprocessor chips with 8, 16, and 32 bit architectures.

Figure 4:
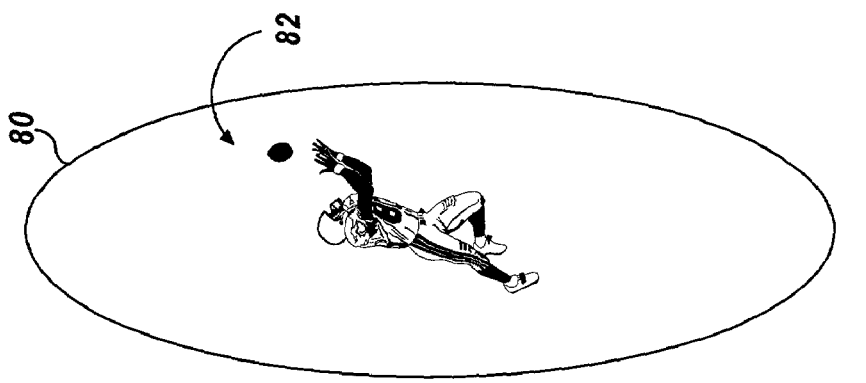
FIG. 4 illustrates a system for providing multiple perspectives through a hand held device of activities at a venue in accordance with preferred embodiments of the present invention.
Figure 4:
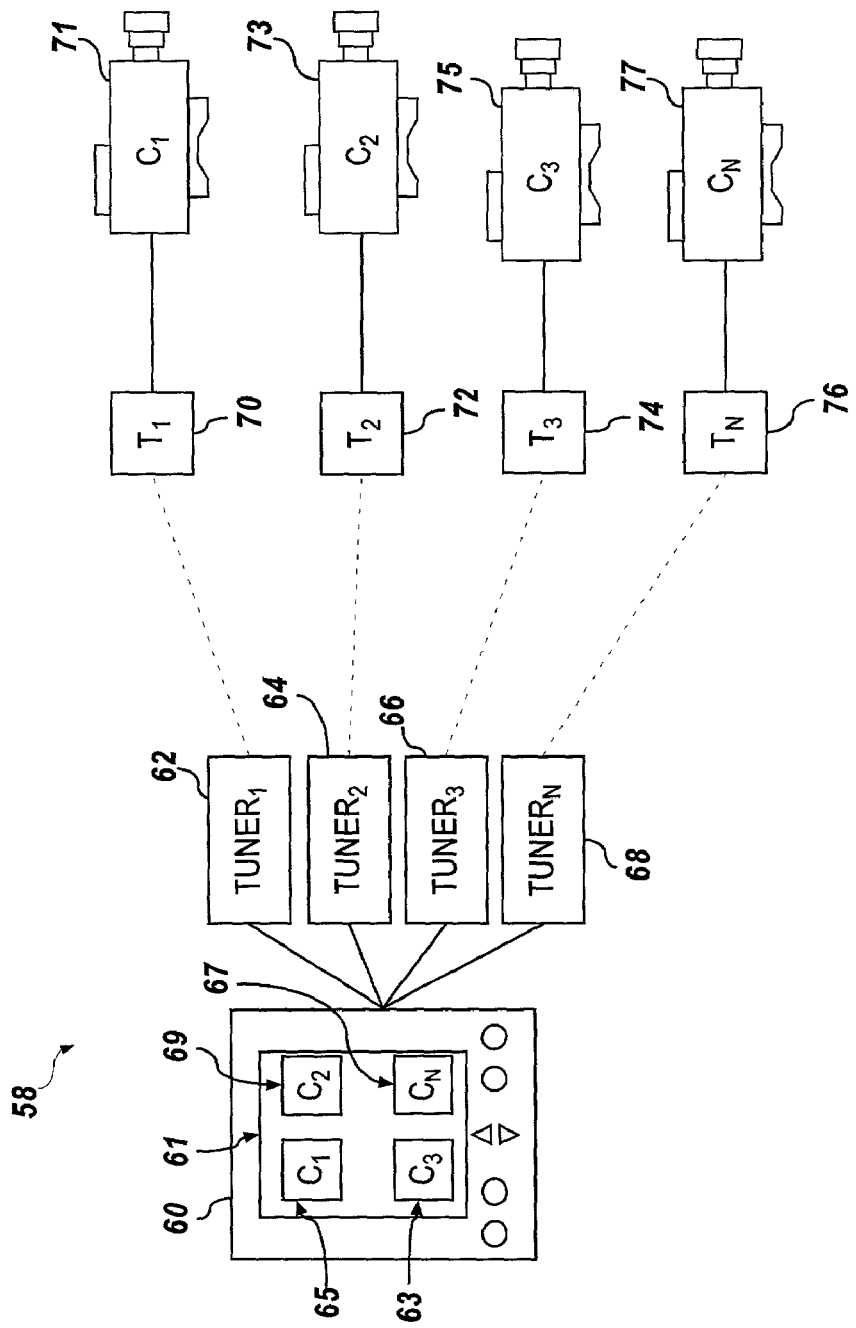

FIG. 4 illustrates a system 58 for providing multiple perspectives through a hand held device 60 of activities at a venue 80, in accordance with preferred embodiments of the present invention. For illustrative purposes only, it may be assumed that venue 80 of FIG. 4 is a stadium venue, such as a football stadium. Cameras 71, 73, 75, and 77 are respectively positioned at strategic points about venue 80 to capture the best images of activity taking place within venue 80. Cameras 71, 73, 75, 77 are respectively linked to transmitters 70, 72, 74, and 76. Each of these transmitters may be configured as equipment, which feeds a radio signal to an antenna for transmission. The equipment may also provide for the securing transmission of signals and associated data. For example, such equipment can rely on the encryption of signals. These signals, if encrypted, can be decrypted by authorized hand held receivers.

The antenna may be integrated with the transmitter. Transmitters are well known in the art, and include active components, such as a driver, well known in the art. Transmitters also include passive components, such as a TX filter, also well known in the art. These components, when operating together, impress a signal onto a radio frequency carrier of the correct frequency by immediately adjusting its frequency, phase, or amplitude, thereby providing enough gain to the signal to project it to its intended target (e.g., a hand held device located within the venue).

A hand held device 60 may be held by a user at a stadium seat within view of the activity at the venue 80. Hand held device 60 is generally analogous to hand held device 11 of FIG. 1 and hand held device 40 of FIG. 2. Hand held device 60 of FIG. 4 may be configured as a hand held device (e.g., PDA, portable television, etc.) adapted for use with a cartridge/module, such as module 50 of hand held device 56 of FIG. 3. The cartridge/module may contain the electronics (e.g., tuner(s), filter(s), security codes, encryption/decryption codes, etc.) to allow a hand held device to be adapted for receiving venue-based data. Hand held device 60 includes a display screen 61 (e.g. display 18 of FIG. 1).

Additionally, display screen 61 of hand held device 60 may be configured with a touch screen user interface displayable and operable on display screen 61. Those skilled in the art can appreciate that touch screen interfaces are well known in the PDA art and further explanation thereof should not be necessary. Display screen 61 can include a touch screen display area 65 that may be associated with camera 71. Thus, images captured by camera 71 are transmitted from transmitter 70, which is linked to camera 71. Additionally, display screen 61 includes touch screen display areas 69, 63, and 67, which are respectively associated with cameras 73, 75, and 77.

Cameras 71, 73, 75, and 77 are respectively labeled $C_1$, $C_2$, $C_3$, and $C_N$ to indicated that a plurality of cameras may be utilized in accordance with system 58 to view activities taking place within venue 80, such as a football game or concert. Although only four cameras are illustrated in FIG. 4, those skilled in the art will appreciate that additional or fewer cameras may be also implemented in accordance with system 58. Touch screen display areas 65, 69, 63, and 67 are also respectively labeled $C_1$, $C_2$, $C_3$, and $C_N$ to illustrate the association between these display areas and cameras 71, 73, 75, and 77 where touch screen technology is utilized.

Hand held device 60 can be integrated with one or more plurality of tuners, as illustrated by tuners 62, 64, 66, and 68. Such tuners can be activated via user controls on hand held device 60 and/or via touch screen icons or areas displayed on display screen 61 that are associated with each tuner. Such icons/areas may be respectively displayed within display areas 65, 69, 63 and 67, or within a separate display area of display screen 61 (e.g., picture-within-picture capabilities found on large television sets). A user accesses tuner 62, for example, to retrieve real-time video images transmitted from transmitter 70 for camera 71. Likewise, a user can access tuner 64 to retrieve real-time video images transmitted from transmitter 72 for camera 73.

In addition, a user can access tuner 74 to retrieve real-time video images transmitted from transmitter 74 for camera 75. Finally, user can access tuner 68 to retrieve real-time video images transmitted from transmitter 76 for camera 77. In the example depicted in FIG. 4, a football player 82 is participating in a football game within venue 80. Cameras 71, 73, 75, and 77 capture moving images (e.g., video data) of the football player 82 from various angles and transmit these images to hand held device 60.

Figure 5:
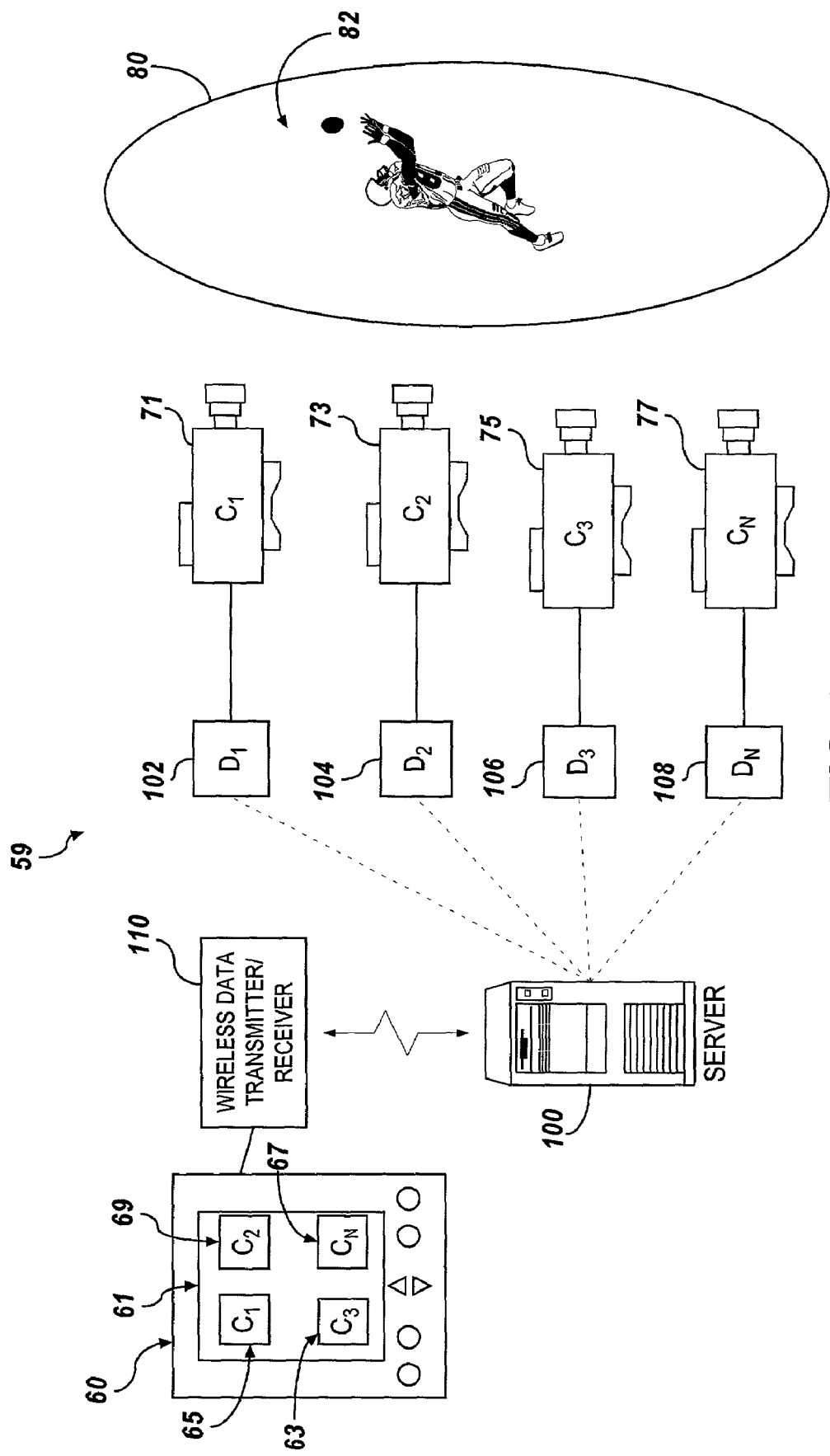
FIG. 5 depicts a system that provides multiple perspectives of a venue activity through a hand held device adapted to receive and process real time video data in accordance with preferred embodiments of the present invention.

FIG. 5 depicts a system 59 that provides multiple perspectives of activity at a venue 80 through a hand held device 60 adapted to receive and process real time video data in accordance with preferred embodiments of the present invention. Note that in FIG. 4 and FIG. 5 analogous parts are indicated by identical reference numerals. Thus, for example, cameras 71, 73, 75, and 77 of FIG. 5 are analogous to cameras 71, 73, 75, and 77 of FIG. 4. Hand held device 60 of FIG. 5 is also analogous to hand held device 60 of FIG. 4 and includes similar features thereof.

Hand held device 60 of FIG. 5, however, can be configured to receive wireless real time video data transmitted for cameras 71, 73, 75, and 77 respectively through data transmitters 102, 104, 106, and 108 to server 100 and thereafter to wireless data transmitter/receiver 110. Note that wireless data transmitter/receiver 110 is analogous to wireless unit 17 of FIG. 1. Hand held device 60 of FIG. 5 is also analogous to hand held device 11 of FIG. 1.

Hand held device 60 of FIG. 5 can also incorporate a touch screen user interface, as described herein with respect to analogous hand held device 60 of FIG. 4. The difference between system 58 of FIG. 4 and system 59 of FIG. 5 lies in the inclusion of digital transmitters 102, 104, 106, and 108 which are respectively linked to cameras 71, 73, 75, and 77 of FIG. 5. In the illustration of FIG. 5, cameras 71, 73, 75, and 77 may be configured as high definition video cameras which capture real time images of events or activities taking place within venue 80, such as real time video footage of football player 82.

A captured image of football player 82, for example, can be transferred from one or more of video cameras 71, 73, 75, and 77 of FIG. 5 and transmitted through a respective digital transmitter, such as digital transmitter 102, 104, 106 or 108 and transmitted via wired and/or wireless communications to server 100. The server 100 then processes the video data received from one or more of the digital transmitters and formats the video data for transmission via wireless means to wireless data transmitter/receiver 100, which may be integrated with hand held device 100. Transmitter/receiver 100 can communicate with the various components of hand held device 60, such as a CPU, image-processing unit, memory units, and so forth.

Those skilled in the art can appreciate that although real time video data may be transmitted to server 100, captured past video images may also be stored within server 100 and transferred to hand held device 60 for display at display screen 61. For example, instant replays may be transferred as video data to hand held device 60 upon the request of a user of hand held device 60. Such instant replay footage can be displayed on display screen 61 for the user to view.

Figure 6:
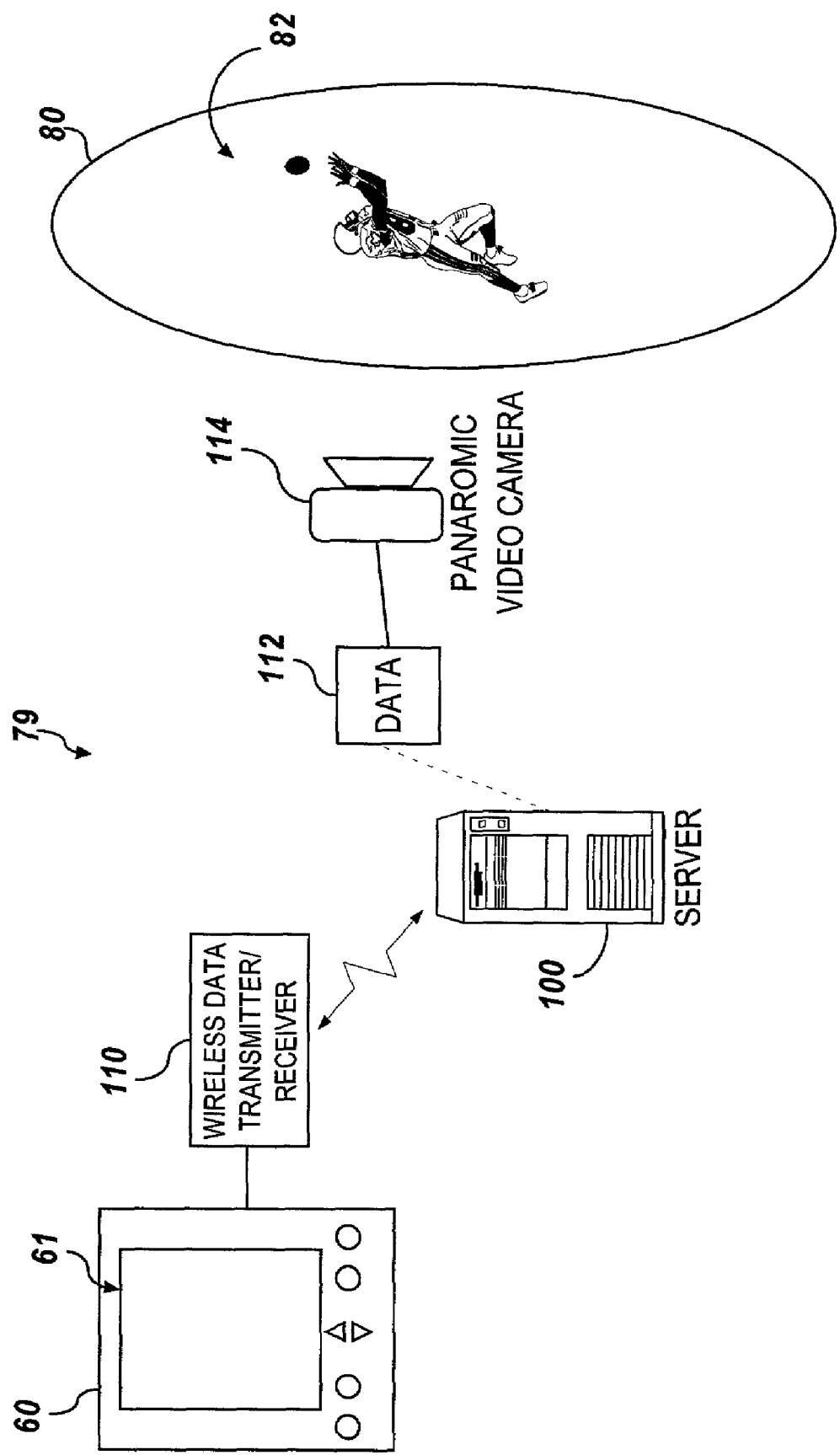
FIG. 6 depicts a system for providing multiple perspectives of activity at a venue through a hand held device adapted to receive and process real time video data in accordance with preferred embodiments of the present invention.

FIG. 6 illustrates a system 79 for providing multiple perspectives of activity at a venue 80 through a hand held device 60 adapted to receive and process real time video data from at least one wide-angle and/or panoramic video camera 114, in accordance with preferred embodiments of the present invention. In system 79 of FIG. 6, wide-angle/panoramic (hereinafter referred to as "panoramic") video camera 114 may be configured as a high-definition panoramic video camera that captures images of activities taking place at venue 80. In the example illustrated in FIG. 6, panoramic video camera 114 can capture of images of a football game and one or more football players, such as illustrated football player 82.

A data transmitter 112 may be linked to panoramic video camera 114. Video data captured by panoramic video camera 114 may be transferred to data transmitter 112, which thereafter transmits the video data to server 100 via a direct link or wireless link, depending on the needs or requirements of the promoters or venue owners. Note that this is also true of the system described in FIG. 6. Server 100 of FIG. 6 is analogous to server 100 of FIG. 5. Thus, in the case of FIG. 5, video data may be transmitted from one or more of data transmitters 102, 104, 106, and 108 via a direct wire/cable link or through wireless transmission means, such as through a wireless network.

Those skilled in the art will appreciate, of course, that hand held device 60 of FIG. 6 is analogous to hand held devices depicted in FIGS. 1-5 herein. In FIGS. 4, 5, and 6, like or analogous parts are identified by identical reference numerals. Thus, images captured by panoramic video camera 114 of activity taking place at venue 80 may be displayed as real time video images or instant replay data on display screen 61 of hand held device 60.

Figure 7:
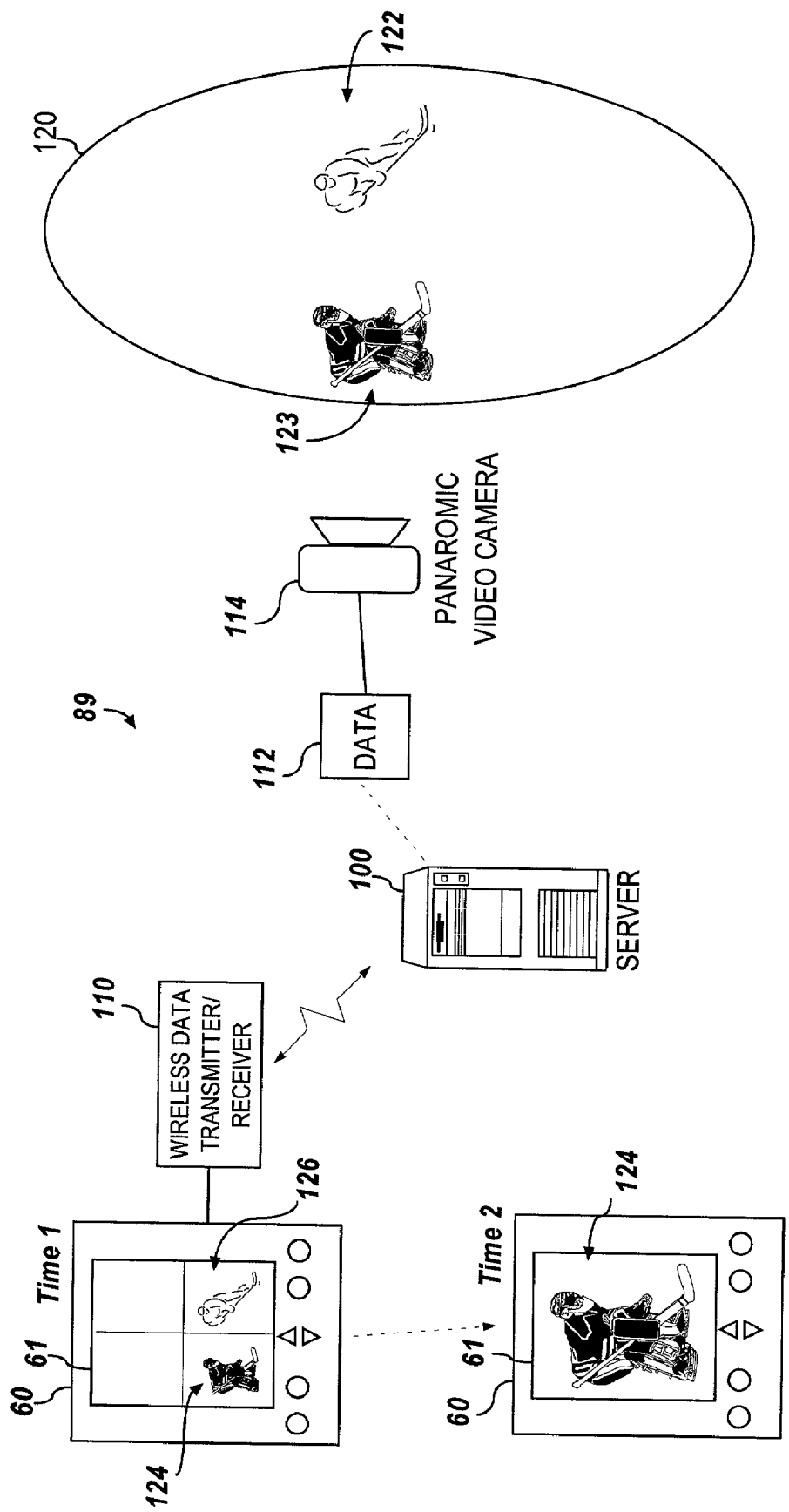
FIG. 7 depicts a system for providing multiple perspectives for activity at a venue at a first time/perspective and a second time/perspective in accordance with preferred embodiments of the present invention.

FIG. 7 depicts a system 89 for providing multiple perspectives for activity at a venue 120 at a first time and/or perspective (Time 1) and a second time and/or perspective (Time 2), in accordance with preferred embodiments of the present invention. In FIGS. 4, 5, 6, and 7, like or analogous parts are indicated by identical reference numerals. Thus, in system 89 of FIG. 7, an event, in this case illustrated as a hockey game, is taking place within venue 120. Venue 120 may be, for example, a hockey arena. Panoramic video camera 114 may be linked to data transmitter 112.

As explained previously, data transmitter 112 may be linked to server 100 via a direct link, such as a transmission cable or line, or through wireless communication means, such as through a wireless network. Server 100 can also communicate with hand held device 60 through a wireless network or other wireless communication means by transmitting data through such a network or wireless communications means to wireless data transmitter/receiver 110. Wireless data transmitter/receiver 110, as explained previously, may be integrated with hand held device 60.

Thus, a video image 124 of a hockey player 122 can be captured as video data by panoramic video camera 114, along with a video image 126 of a hockey player 123 and displayed within display screen 61 of hand held device 60 as indicated at Time 1. Video image 124 and 126 can be displayed within a grid-like interface on display screen 61. Note that in the illustration of FIG. 7, display screen 61 may be divided into four sections.

When a user touches, for example the area or section of display screen 61 in which video image 124 may be displayed, the entire display area of display screen 61 can then be consumed with a close-up video shot of video image 124, as indicated at Time 2, thereby providing the user with a closer view of hockey player 122. Those skilled in the art can appreciate that the touch screen display area of display screen 61 can be arranged with graphical icons and/or user-controls that perform specific pan and zoom functions. Such icons/user-controls, when activated by a user, permit the user to retrieve panned/zoomed images of events taking place in real time within venue 120.

Note that although only one panoramic video camera 114 and one data transmitter 112 are illustrated in FIG. 7, a plurality of panoramic video cameras, servers, and data transmitters may be implemented in accordance with the present invention to capture the best video images, image-processing, and signal capacity to users, whether real time or otherwise, of events taking place at venue 120.

Figure 8:
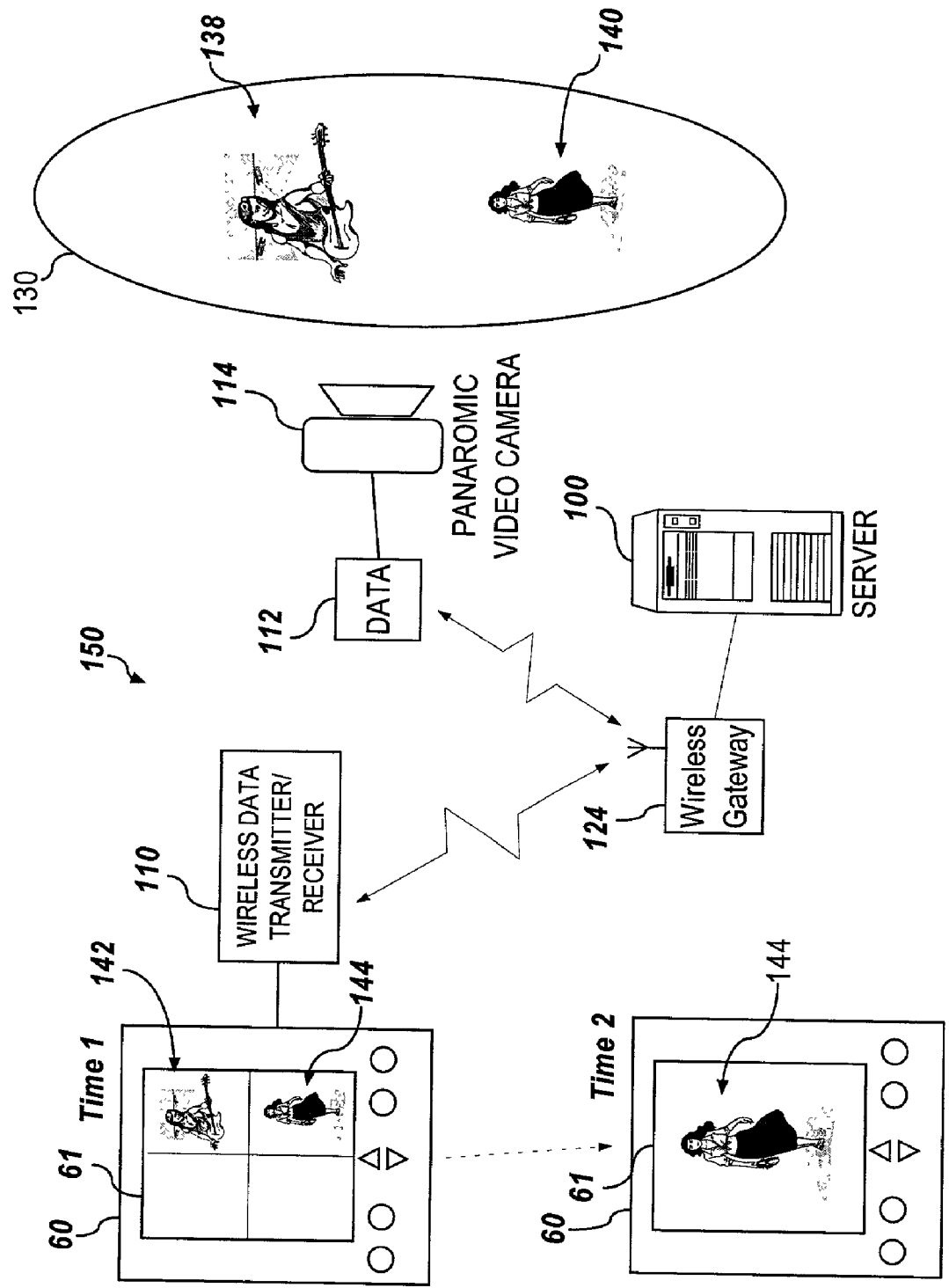
FIG. 8 illustrates a system for providing multiple perspectives through a hand held device of an activity at a venue including the use of a wireless gateway in accordance with a preferred embodiment of the present invention.

FIG. 8 illustrates a system 92 for providing multiple perspectives through hand held device 60 of an activity at a venue 130, including the use of a wireless gateway 124, in accordance with a preferred embodiment of the present invention. Those skilled in the art can appreciate that wireless gateway 124 may be configured as an access point for a wireless LAN (Local Area Network). Access points for wireless LAN networks and associated wired and wireless hardware (e.g., servers, routers, gateways, etc.) are well known in the art and may be utilized in accordance with the present invention described herein. Again, note that in FIGS. 4, 5, 6, 7, and 8, like or analogous parts are indicated by identical reference numerals. System 92 of FIG. 8 is analogous to system 89 of FIG. 7, the difference being in the nature of the venue activity. Venue 130 can be, for example, a concert hall or stadium configured with a sound stage.

Figure 9:
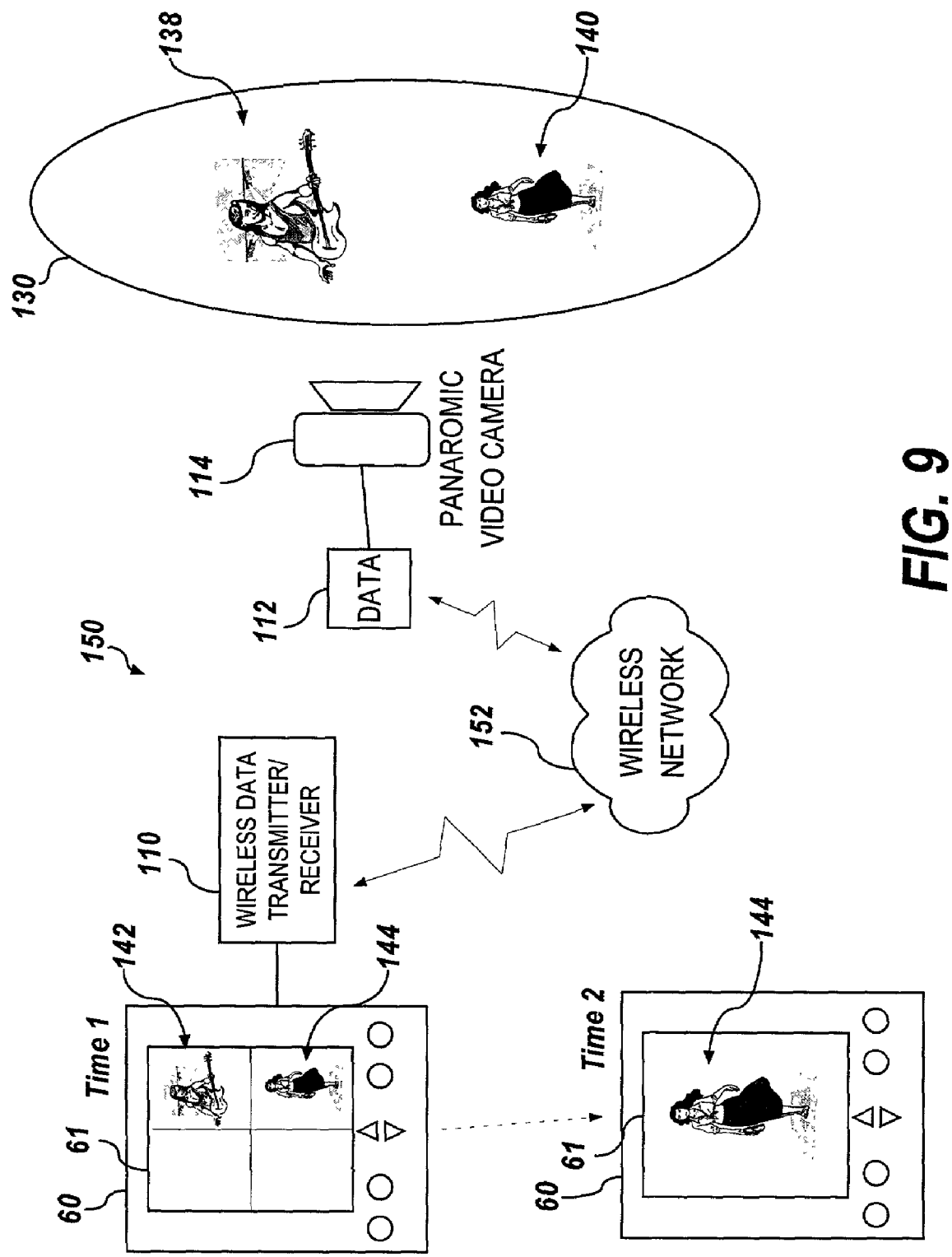
FIG. 9 depicts a system for providing multiple perspectives through a hand held device of a venue activity, in association with a wireless network in accordance with preferred embodiments of the present invention.

Gateway 124 can be configured as a communications gateway through which data may enter or exit a communications network, such as wireless network 152 illustrated in FIG. 9 for a large capacity of user hand device 60 users. Wireless network 152 may be configured as a wireless LAN network. Hand held device 60 can be configured to communicate and receive transmissions from such a wireless LAN network based on device identification (e.g., device address). Communication with hand held devices, such as hand held device 60, however, may also be, achieved through RF (Radio Frequency) broadcasts, thereby not requiring two-way communication and authentication between, for example, a wireless LAN network and such hand held devices. A broadcast under such a scenario may also require that such a hand held device or hand held devices possess decryption capabilities or the like in order to be authorized to receive transmissions from the venue.

The remaining elements of FIG. 8 are also analogous to the elements depicted in the previous drawings, with the addition of wireless gateway 124, which may be linked to server 100 and may be in communication with several wireless data transmitters/receivers 110 and one or more electronic hand held devices, including hand held device 60. Wireless data transmitter/receiver 110, as explained previously, may be integrated with hand held device 60. One or more panoramic video cameras, such as panoramic video camera 114, can be positioned at a venue 130 at locations that capture images not only of the events taking place on a concert stage, but also events taking place within the stadium itself.

If an audience member 140, for example, happens to be walking along a stadium aisle within view of panoramic video camera 114, the audience member's video image can be displayed as video image 144 within display screen 61 of hand held device 60, as indicated at Time 1. Likewise, panoramic video camera 114 captures images of band member 138 whose video image can be displayed as video image 142 within a display area of display screen 61, as indicated at Time 1.

Thus, a user of hand held device 60 can view not only the events taking place on a central performing platform of venue 130, but also other events within the arena itself. The band member 138 may be located on a central performing platform (not shown) of venue 130 when panoramic video camera 114 captures real-time video images of band member 138. The user may also, for example, wish to see a close-up of audience member 140. By activating user controls and/or a touch screen interface integrated with display screen 61, the user can, for example, pan or zoom to view a close-up video shot of audience member 140, as indicated at Time 2.

Captured video images are transferred from panoramic video camera 114 as video data through transmitter 112 to server 100 and through wireless gateway 124 to wireless data transmitter/receiver 110. Although a single server 100 is illustrated in FIG. 8, those skilled in the art can appreciate that a plurality of servers and/or wireless gateways can be implemented in accordance with the methods and systems of the present invention to process and deliver captured and transmitted video data. Based on the foregoing, those skilled in the art can appreciate that video data may be simultaneously transferred from server 100 or a plurality or servers to literally thousands of hand held devices located within the range of the wireless network and/or wireless gateways associated with venue 130.

FIG. 9 illustrates a system 150 for providing multiple perspectives through hand held device 60 of an activity at a venue 130 in association with a wireless network 152, in accordance with preferred embodiments of the present invention. System 150 of FIG. 9 is analogous to system 92 of FIG. 8, the difference noted in the inclusion of wireless network 152. Thus, in FIG. 8 and FIG. 9, like or analogous parts are indicated by identical reference numerals. Video data captured by a camera or cameras, such as panoramic video camera 114, may be transferred to data transmitter 112, which transmits the video data to wireless network 152. Wireless network 152 then retransmits the data, at the request of authorized users of hand held devices, such as hand held device 60, to wireless data transmitters/receivers, such as transmitter/receiver 110 integrated with hand held device 60.

Those skilled in the art can appreciate that wireless network 152 may also receive and retransmit other data, in addition to video data. For example, a server or other computer system may be integrated with wireless network 152 to provide team and venue data, which can then be transferred to wireless data transmitter receiver 110 from wireless network 152 and displayed thereafter as team and venue information within display screen 61 of hand held device 60. Other data that may be transferred to hand held device for display include real-time and historical statistics, purchasing, merchandise and concession information, and additional product or service advertisements.

Such data can include box scores, player information and matchups, animated playbooks, shot/hit/pitch charts, historical information, and offense-defense statistics. In a concert venue, for example, as opposed to a sporting event, information pertaining to a particular musical group can be also transferred to the hand held device, along with advertising or sponsor information. Note that both the video data and other data described above generally comprise types of venue-based data. Venue-based data, as referred to herein, may include data and information, such as video, audio, advertisements, promotional information, propaganda, historical information, statistics, event scheduling, and so forth, associated with a particular venue and/or its advertisers/sponsors generally not retrievable through public networks.

Such information can be transmitted together with video data received from data transmitter 112. Such information may be displayed as streaming data within display area 61 of hand held device 60 or simply stored in a database within hand held device 60 for later retrieval by the user.

One example of a wireless network that may be utilized to implement wireless network 152 can be Bluetooth, which is described in greater detail herein, and was conceived originally to make up for the shortcomings of infrared technologies (IR). Because IR cannot be utilized to penetrate walls, carry data heavy signals, or operate within devices that are not in line of sight, Bluetooth, which is becoming well known the art, can be configured as or with wireless network 152.

Figure 10:
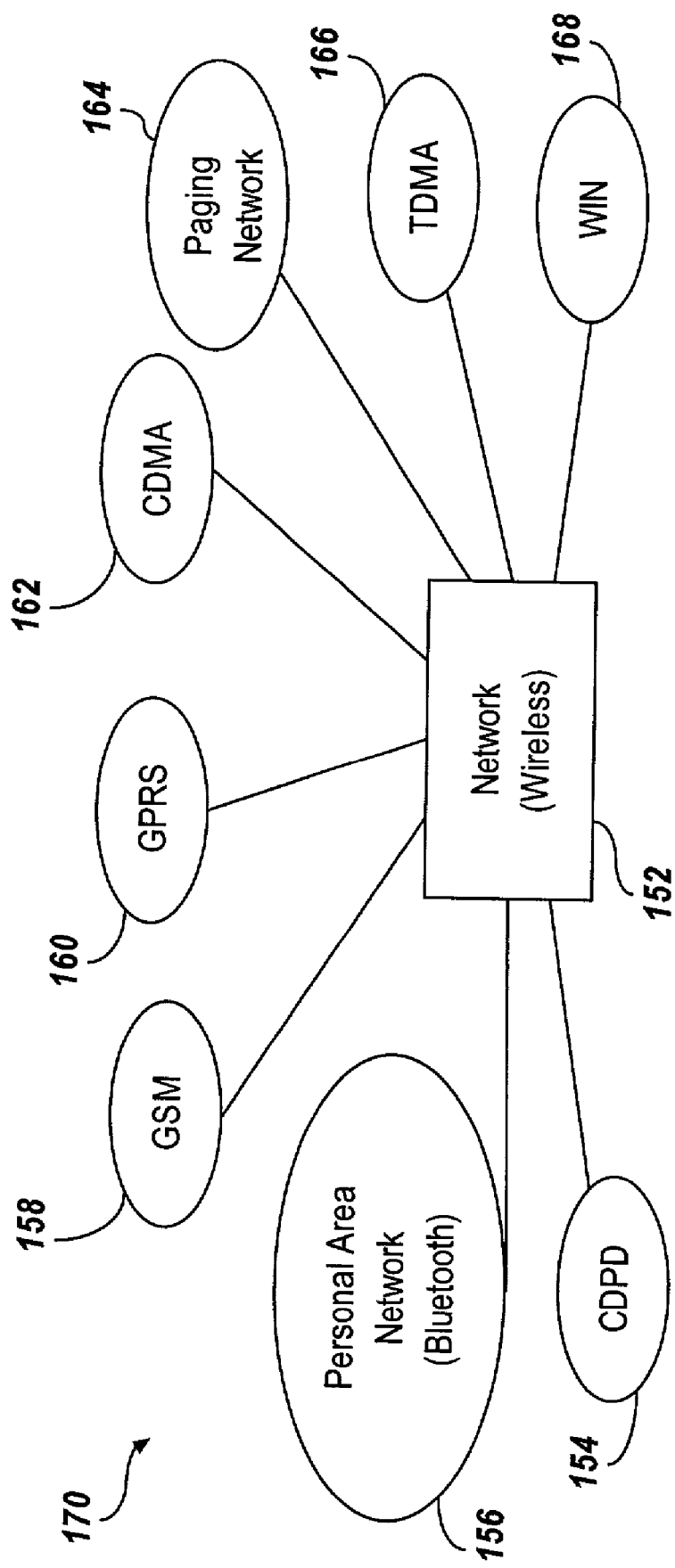
FIG. 10 illustrates a diagram depicting network attributes of a wireless network that may be utilized in accordance with preferred embodiments of the present invention.

FIG. 10 illustrates an entity diagram 170 depicting network attributes of wireless network 152 that may be utilized in accordance with preferred embodiments of the present invention. A wireless network 152 as illustrated in FIG. 10 can be configured as a variety of possible wireless networks. Thus, entity diagram 170 illustrates attributes of wireless network 152, which may or may not be exclusive of one another.

Those skilled in the art can appreciate that a variety of possible wireless communications and networking configurations may be utilized to implement wireless network 152. Wireless network 152 may be, for example, implemented according to a variety of wireless protocols, including cellular, Bluetooth, and 802.11 RF or direct IR communications. Wireless network 152 can be implemented as a single network type or a network based on a combination of network types (e.g., Bluetooth, CDMA, etc).

Wireless network 152 may be configured with teachings/aspects of CDPD (Cellular Digital Packet Data) networks well known in the networking arts. CDPD network 154 is illustrated in FIG. 10. CDPD may be configured as a TCP/IP based technology that supports Point-to-Point (PPP) or Serial Line Internet Protocol (SLIP) wireless connections to mobile devices, such as the hand held devices described and illustrated herein. Mobility and/or cellular service are generally available throughout the world from major service providers. Data can be transferred utilizing CDPD protocols.

Current restrictions of CDPD are not meant to limit the range or implementation of the method and system described herein, but are described herein for illustrative purposes only. It is anticipated that CDPD will be continually developed, and that such new developments can be implemented in accordance with the present invention.

Wireless network 152 may preferably be also configured with teachings/aspects of a Personal Area Network 156 or Bluetooth, as described herein. Bluetooth was adopted by a consortium of wireless equipment manufacturers referred to at the Bluetooth Special Interest Group (BSIG), and has emerged as a global standard for low cost wireless data and voice communication. Current specifications for this standard call for a 2.4 GHz ISM frequency band. Bluetooth technology is generally based on a short-range radio transmitter/receiver built into small application specific circuits (ASICS, DSPs) and embedded into support devices, such as the hand held devices described and illustrated herein.

The Bluetooth standard permits up to 100 mw of power, which can increase the range to 100 M. In addition, Bluetooth can support several data channels. Utilizing short data packets and frequency hopping of up to 1600 hops per second, Bluetooth is a wireless technology that can be utilized to enable the implementation of the methods and systems described herein. Current restrictions of Bluetooth are not meant to limit the range or implementation of the present invention, but are described herein for illustrative purposes only. It is anticipated Bluetooth will be continually developed, and that such new developments can be implemented in accordance with the present invention.

Wireless network 152 may also be configured utilizing teachings/aspects of GSM network 158. GSM (Global System for Mobile Communication) and PCS (Personal Communications Systems) networks, both well known in the telecommunications arts, generally operate in the 800 MHz, 900 MHz, and 1900 MHz range. PCS initiates narrowband digital communications in the 900 MHz range for paging, and broadband digital communications in the 1900 MHz band for cellular telephone service. In the United States, PCS 1900 is generally equivalent to GSM 1900. GSM operates in the 900 MHz, 1800-1900 MHz frequency bands, while GSM 1800 is widely utilized throughout Europe and many other parts of the world.

In the United States, GSM 1900 is generally equivalent to PCS 1900, thereby enabling the compatibility of these two types of networks. Current restrictions of GSM and PCS are not meant to limit the range or implementation of the present invention, but are described herein for illustrative purposes only. It is anticipated that GSM and PCS will be continually developed, and that aspects of such new developments can be implemented in accordance with the present invention.

Wireless network 152 may also utilize teachings/aspects of GPRS network 160. GPRS technology, well-known in the telecommunications arts, bridges the gap between current wireless technologies and the so-called "next generation" of wireless technologies referred to frequently as the third-generation or 3G wireless technologies. GPRS is generally implemented as a packet-data transmission network that can provide data transfer rates up to 115 Kbps. GPRS can be implemented with CDMA and TDMA technology and supports X.25 and IP communications protocols, all well known in the telecommunications arts. GPRS also enables features, such as Voice over IP (VoIP) and multimedia services. Current restrictions of GPRS are not meant to limit the range or implementation of the present invention, but are described herein for illustrative purposes only. It is anticipated that GPRS will be continually developed and that such new developments can be implemented in accordance with the present invention.

Wireless network 152 may also be implemented utilizing teaching/aspects of a CDMA network 162 or CDMA networks. CDMA (Code Division Multiple Access) is a protocol standard based on IS-95 CDMA, also referred to frequently in the telecommunications arts as CDMA-1. IS-95 CDMA is generally configured as a digital wireless network that defines how a single channel can be segmented into multiple channels utilizing a pseudo-random signal (or code) to identify information associated with each user. Because CDMA networks spread each call over more than 4.4 trillion channels across the entire frequency band, it is much more immune to interference than most other wireless networks and generally can support more users per channel.

Currently, CDMA can support data at speeds up to 14.4 Kbps. Wireless network 152 may also be configured with a form of CDMA technology known as wideband CDMA (W-CDMA). Wideband CDMA may be also referred to as CDMA 2000 in North America. W-CDMA can be utilized to increase transfer rates utilizing multiple 1.25 MHz cellular channels. Current restrictions of CDMA and W-CDMA are not meant to limit the range or implementation of the present invention, but are described herein for illustrative purposes only. It is anticipated that CDMA and W-CDMA will be continually developed and that such new developments can be implemented in accordance with the present invention.

Wireless network 152 may be also implemented utilizing teachings/aspects of paging network 164. Such paging networks, well known in the telecommunications arts, can be implemented in accordance with the present invention to enable transmission or receipt of data over the TME/X protocol, also well known in the telecommunications arts. Such a protocol enables notification in messaging and two-way data coverage utilizing satellite technology and a network of base stations geographically located throughout a particular geographical region. Paging network 162 can be configured to process enhanced 2-way messaging applications.

Unified messaging solutions can be utilized in accordance with wireless network 152 to permit carriers and Internet service providers to manage customer e-mail, voice messages and fax images and can facilitate delivery of these communications to PDAs, telephony devices, pagers, personal computers and other capable information retrieval devices, wired or wireless.

Current restrictions of such paging networks are not meant to limit the range or implementation of the present invention, but are described herein for illustrative purposes only. It is anticipated that such paging networks, including those based on the TME/X protocol, will be continually developed and that such new developments can be implemented in accordance with the present invention.

Wireless network 152 may also be configured utilizing teachings/aspects of TDMA networks 166. TDMA (Time Division Multiple Access) is a telecommunications network utilized to separate multiple conversation transmissions over a finite frequency allocation of through-the-air bandwidth. TDMA can be utilized in accordance with the present invention to allocate a discrete amount of frequency bandwidth to each user in a TDMA network to permit many simultaneous conversations or transmission of data. Each user may be assigned a specific timeslot for transmission. A digital cellular communications system that utilizes TDMA typically assigns 10 timeslots for each frequency channel.

A hand held device operating in association with a TDMA network sends bursts or packets of information during each timeslot. Such packets of information are then reassembled by the receiving equipment into the original voice or data/ information components. Current restrictions of such TDMA networks are not meant to limit the range or implementation of the present invention, but are described herein for illustrative purposes only. It is anticipated that TDMA networks will be continually developed and that such new developments can be implemented in accordance with the present invention.

Wireless network 152 may also be configured utilizing teachings/aspects of Wireless Intelligent Networks (WINs) 168. WINs are generally known as the architecture of the wireless switched network that allows carriers to provide enhanced and customized services for mobile telephones. Intelligent wireless networks generally include the use of mobile switching centers (MSCs) having access to network servers and databases such as Home Location Registers (HLRs) and Visiting Location Registers (VLRs), for providing applications and data to networks, service providers and service subscribers (wireless device users).

Local number portability allows wireless subscribers to make and receive calls anywhere—regardless of their local calling area. Roaming subscribers are also able to receive more services, such as call waiting, three-way calling and call forwarding. A HLR is generally a database that contains semipermanent mobile subscriber (wireless device user) information for wireless carriers' entire subscriber base.

A useful aspect of WINs for the present invention is enabling the maintenance and use of customer profiles within an HLR/VLR-type database. Profile information may be utilized for example with season ticket holders and/or fans of traveling teams or shows. HLR subscriber information as used in WINs includes identity, service subscription information, location information (the identity of the currently serving VLR to enable routing of communications), service restrictions and supplementary services/information. HLRs handle SS7 transactions in cooperation with Mobile Switching Centers and VLR nodes, which request information from the HLR or update the information contained within the HLR. The HLR also initiates transactions with VLRs to complete incoming calls and update subscriber data. Traditional wireless network design is generally based on the utilization of a single HLR for each wireless network, but growth considerations are prompting carriers to consider multiple HLR topologies.

The VLR may also be configured as a database that contains temporary information concerning the mobile subscribers currently located in a given MSC serving area, but whose HLR may be elsewhere. When a mobile subscriber roams away from the HLR location into a remote location, SS7 messages are used to obtain information about the subscriber from the HLR, and to create a temporary record for the subscriber in the VLR.

Signaling System No. 7 (referred to as SS7 or C7) is a global standard for telecommunications. In the past the SS7 standard has defined the procedures and protocol by which network elements in the public switched telephone network (PSTN) exchange information over a digital signaling network to effect wireless and wireline call setup, routing, control, services, enhanced features and secure communications. Such systems and standards may be utilized to implement wireless network 152 in support of venue customers, in accordance with the present invention.

Improved operating systems and protocols allow Graphical User Interfaces (GUIs) to provide an environment that displays user options (e.g., graphical symbols, icons or photographs) on a wireless device's screen. Extensible Markup Language ("XML") is generally a currently available standard that performs as a universal language for data, making documents more interchangeable. XML allows information to be used in a variety of formats for different devices, including PCs, PDAs and web-enabled mobile phones.

XML enables documents to be exchanged even where the documents were created and/or are generally used by different software applications. XML may effectively enable one system to translate what another systems sends. As a result of data transfer improvements, wireless device GUIs can be utilized in accordance with a hand held device and wireless network 152, whether configured as a paging network or another network type, to render images on the hand held device that closely represent the imaging capabilities available on desktop computing devices.

Those skilled in the art can appreciate that the system and logical processes described herein relative to FIG. 11 to FIG. 17 are not limiting features of the present invention. Rather, FIG. 11 to FIG. 17 provide examples of image-processing systems and logical processes that can be utilized in accordance with the present invention. Such a system and logical processes represent one possible technique, which may be utilized in accordance with one or more embodiments of the present invention to permit a user of a hand held device to manipulate video images viewable on a display screen of the hand held device.

Figure 11:
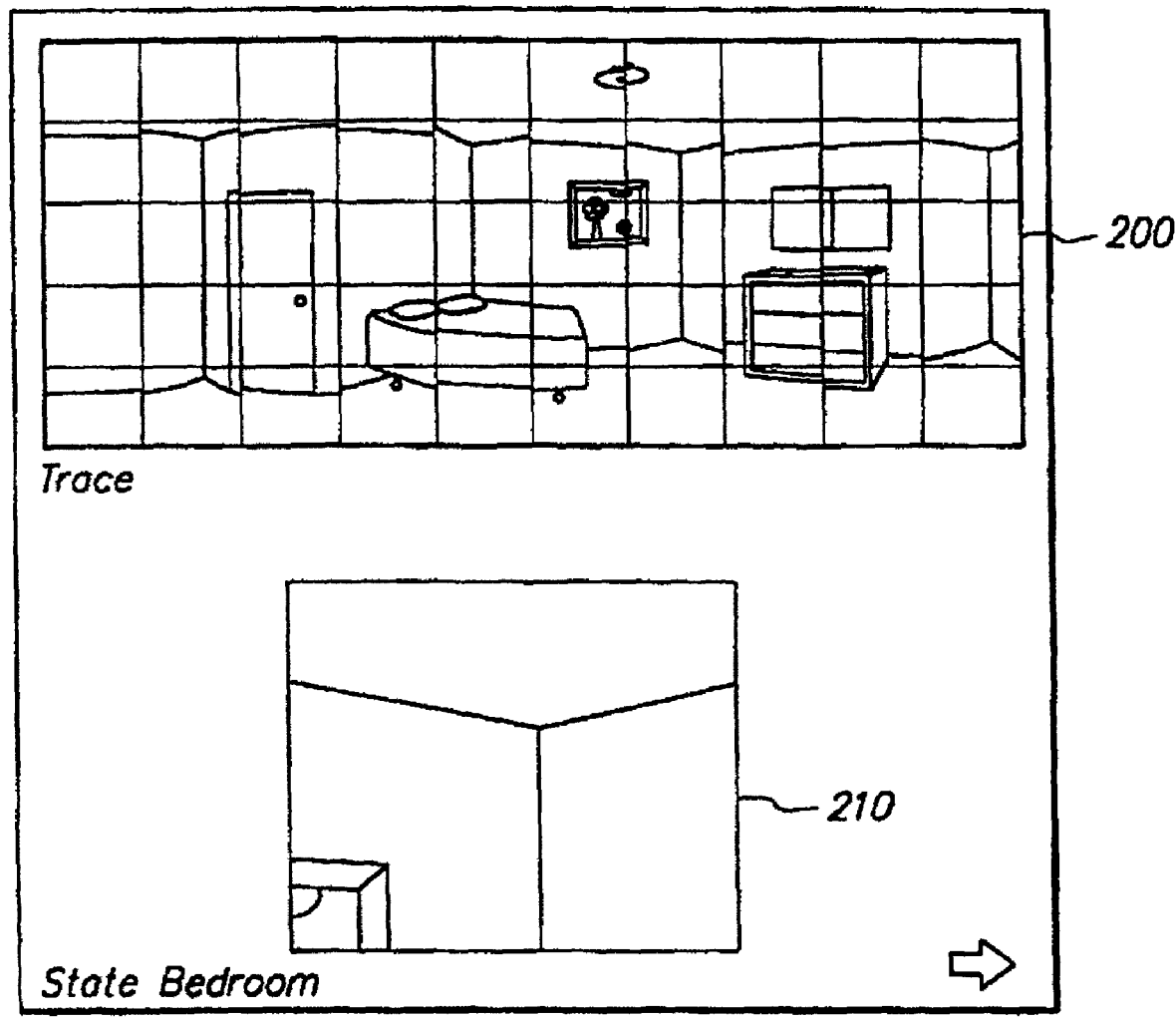
FIG. 11 depicts a prior art overview display and a detail window.
Figure 12:
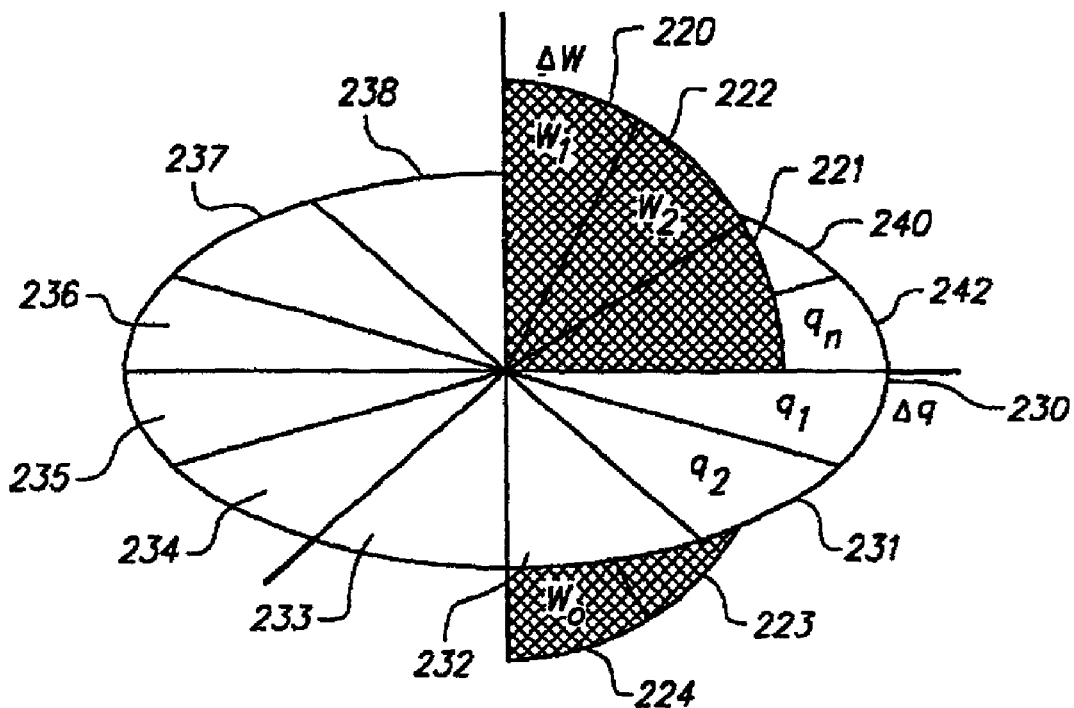
FIG. 12 illustrates a prior art spherical image space divided into a series of w rows and q columns, with the rows and columns representing individual frames as photographed from a video camera.

FIG. 11 thus illustrates a prior art overview display 200 and a detail window 210 that may be utilized with embodiments of the present invention. The overview image display 200 is a view representative of a 360° rotation around a particular point in a space. While a complete rotational view may be utilized in accordance with preferred embodiments of the present invention, one of ordinary skill in the computer arts will readily comprehend that a semi-circular pan (such as used with wide-angle cameras) or other sequence of images could be substituted for the 360 degree rotation without departing from the subject invention. The vantage point is generally where the camera was located as it panned the space. Usually the scene is captured in a spherical fashion as the camera pans around the space in a series of rows as depicted in FIG. 12. The space is divided into w rows 220-224 and q columns 230-242 with each q representing another single frame as shown in FIG. 12.

Figure 13:
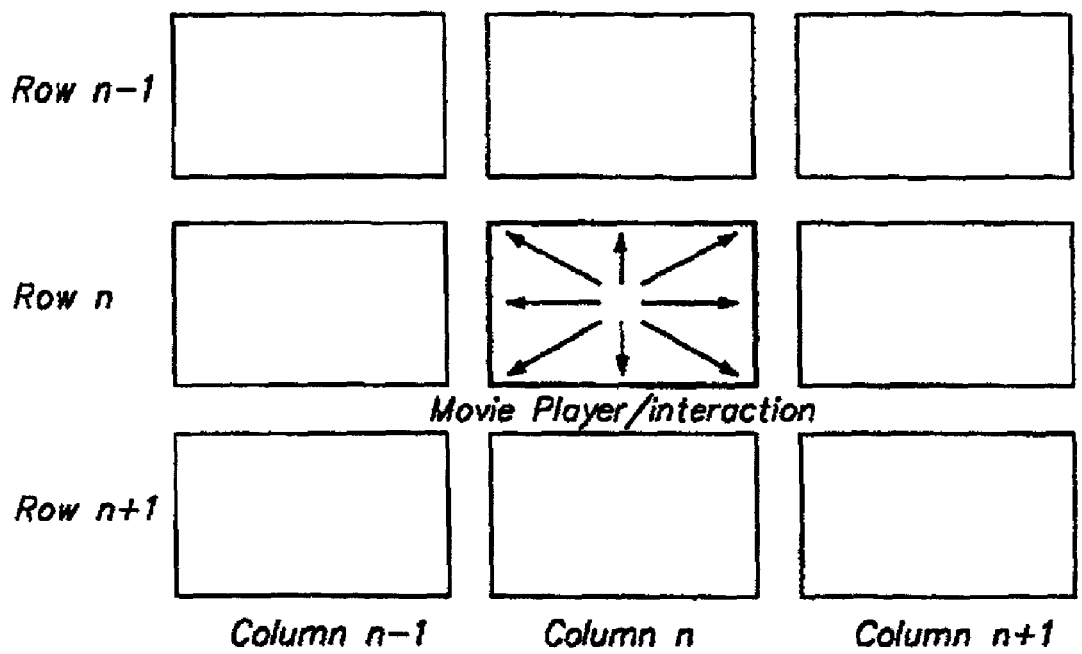
FIG. 13 depicts the two-dimensional representation of the spherical image space of FIG. 12 into rows and columns of image frames.

User control over the scene (e.g., rotation, pan, zoom) may be provided by pressing a touch screen display icon or moving a cursor displayed on a display screen of a hand held device, such as the hand held devices described herein. User control over the scene may also be provided by manipulating external user controls integrated with a hand held device (e.g., user controls 44 and 54 of FIG. 2 and FIG. 3). Movement from a frame in the overview image display to another frame is in one of eight directions as shown in FIG. 13. The user may interact with the video representation of the space one frame at a time. Each individual frame is an image of one of the pictures taken to capture the space as discussed above. The individual frames may be pieced together.

Interacting with a video one frame at a time results in the ability to present a detailed view of the space. The user can experience the overview image display as it unfolds a single frame at a time. In a venue application, a user may chose to view different sections of a larger area by browsing to a particular area are provided. The area chosen may be at a high resolution allowing for the user to zoom in and out of the section.

Another limitation of a simple overview viewer is that there is no random access means. The frames can only be viewed sequentially as the overview image display is unfolded. As adapted for use in accordance with the present invention, this problem has been overcome by providing tools to browse, randomly select and trace selected images associated with any overview image.

Figure 14:
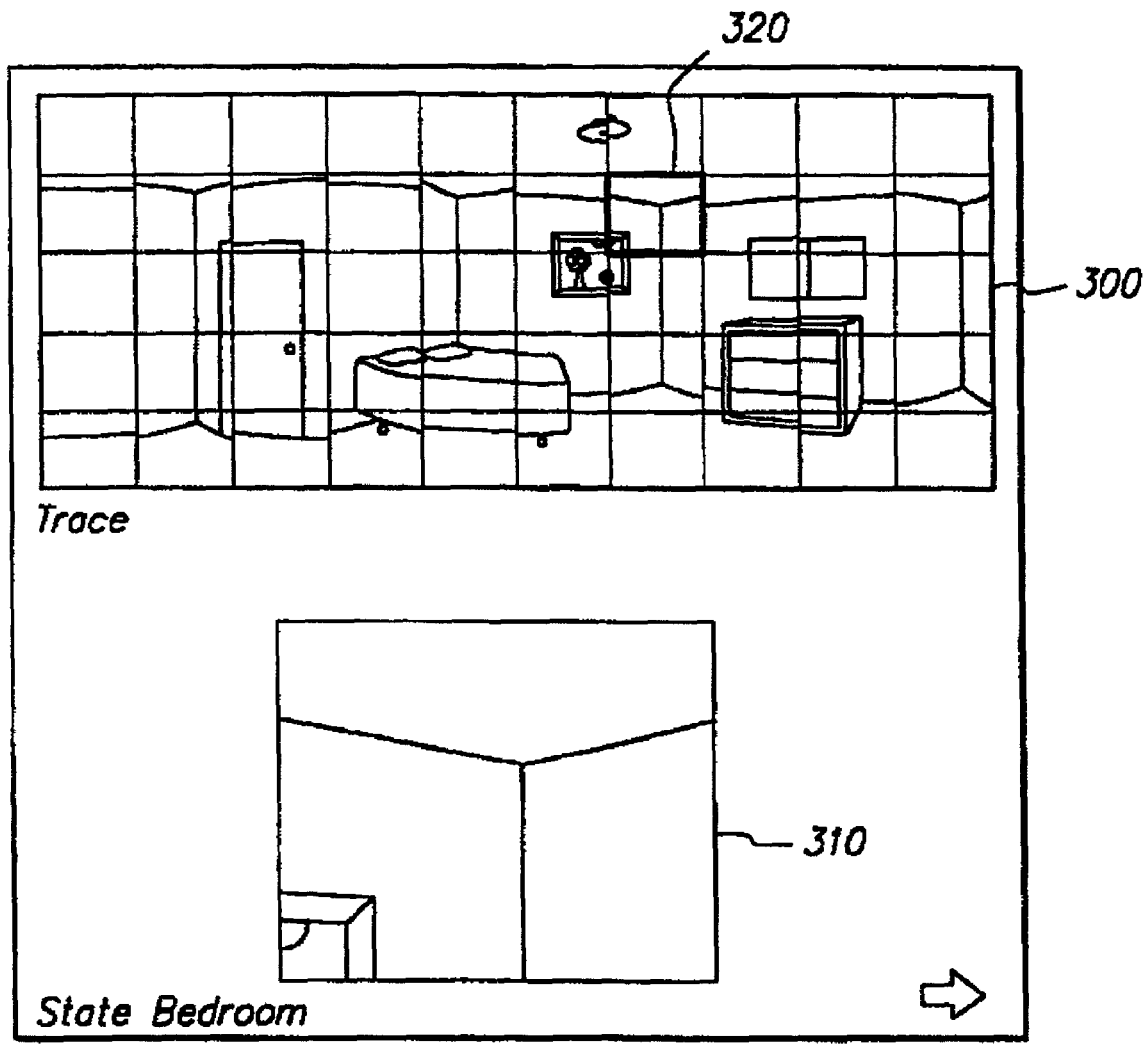
FIG. 14 illustrates a prior art overview display, a detail window and a corresponding area indicia (geometric figure outline)

FIG. 14 illustrates a prior art overview image 300, a detail window 310 and a corresponding area indicia, in this case a geometric figure outline 320. The detail window 310 corresponds to an enlarged image associated with the area bounded by the geometric figure outline 320 in the overview image 300. As the cursor is moved, the location within the overview image 300 may be highlighted utilizing the geometric figure outline 320 to clearly convey what location the detail window 310 corresponds to.

One of ordinary skill in the computer arts will readily comprehend that reverse videoing the area instead of enclosing it with a geometric figure would work equally well. Differentiating the area with color could also be used without departing from the invention. A user can select any position within the overview image, press the cursor selection device's button (for example, user controls in the form of touch screen user interface buttons or icons), and an enlarged image corresponding to the particular area in the overview display is presented in the detail window 310. Thus, random access of particular frames corresponding to the overview image may be provided.

Figure 15:
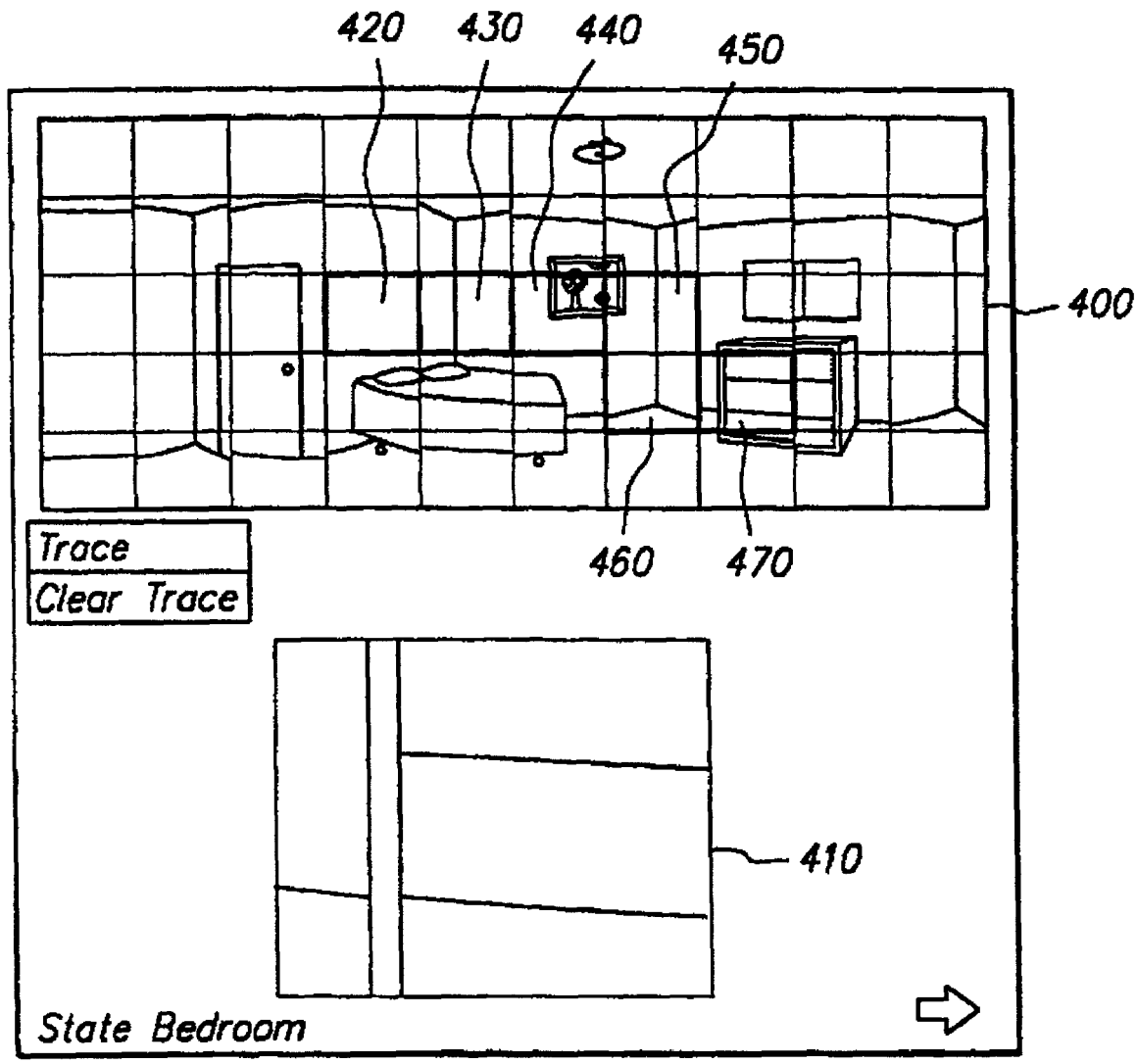
FIG. 15 depicts a prior art series of saved geometric figure outlines corresponding to user selections in tracing through an overview image display for subsequent playback, which may be utilized in accordance with embodiments of the present invention.

FIG. 15 illustrates a prior art series of saved geometric figure outlines corresponding to user selections in tracing through an overview display for subsequent playback. The overview image 400 has a detail window 410 with an enlarged image of the last location selected in the overview image 470. Each of the other cursor locations traversed in the overview image 420, 430, 440, 450 and 460 are also enclosed by an outline of a geometric figure to present a trace to the user.

Each of the cursor locations may be saved, and because each corresponds to a particular frame of the overview image, the trace of frames can be replayed at a subsequent time to allow another user to review the frames and experience a similar presentation. Locations in the detailed window and the overview image can also be selected to present other images associated with the image area, but not necessarily formed from the original image.

For example, a china teacup may appear as a dot in a china cabinet, but when the dot is selected, a detailed image rendering of the china teacup could appear in the detailed window. Moreover, a closed door appearing in an image could be selected and result in a detailed image of a room located behind the door even if the room was not visible in the previous image. Finally, areas in the detailed window can also be selected to enable further images associated with the detailed window to be revealed. Details of objects within a scene are also dependent on resolution capabilities of a camera. Cameras having appropriate resolution and/or image processing capabilities are preferably used in accordance with certain aspects of the present invention.

The overview image was created as discussed above. To assist one of ordinary skill in the art to make and use the invention, a more detailed discussion of the necessary processing is presented below with reference to FIG. 16 and FIG. 17 herein.

Figure 16:
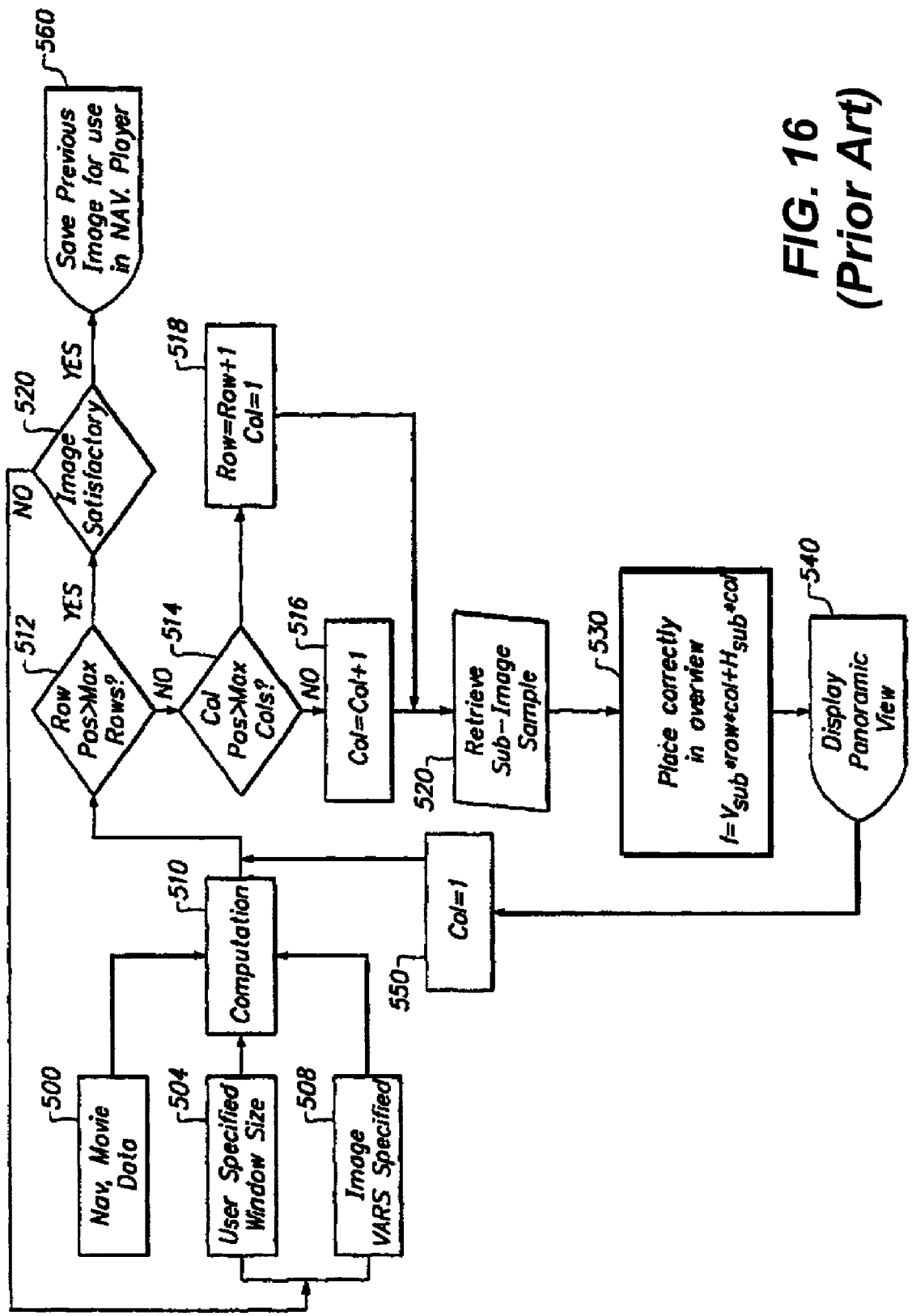
FIG. 16 is a prior art flowchart providing a logical process for building an overview image, which may be utilized in accordance with embodiments of the present invention.

FIG. 16 depicts a prior art flowchart providing a logical process for building an overview image display. Such a logical process may be utilized in accordance with the present invention, but is not a necessary feature of the present invention. Those skilled in the art will appreciate that such a logical process can merely an example of one type of image-processing algorithm that may be utilized in accordance with embodiments of the present invention. For example, such a logical process may be implemented as a routine or subroutine that runs via image-processing unit 35 of FIG. 1 in a hand held device. Those skilled in the art can appreciate that the logical process described with relation to FIGS. 16 and 17 herein are not limiting features of the present invention.

Such logical processes, rather, are merely one of many such processes that may be utilized in accordance with the present invention to permit a user to manipulate video images displayed via a display screen of a hand held device. Navigable movie/video data in the form of images input to the hand held device to form individual images can be thus processed, as illustrated at function block 500. User specified window size (horizontal dimension and vertical dimension) may be entered, as illustrated at function block 504.

Image variables can be specified (horizontal sub-sampling rate, vertical sub-sampling rate, horizontal and vertical overlap of individual frame images, and horizontal and vertical clip (the number of pixels are clipped from a particular frame in the x and y plane)), as depicted at function block 508. Function blocks 500, 504 and 508 are fed into the computation function block 510 where the individual frames are scaled for each row and column, and the row and column variables are each initialized to one.

Then a nested loop can be invoked to create the overview image. First, as indicated at decision block 512, a test is performed to determine if the maximum number of rows has been exceeded. If so, then the overview image is tested to determine if its quality is satisfactory at decision block 520. If the quality is insufficient, the user may be provided with an opportunity to adjust the initial variables, as illustrated at function blocks 504 and 508. The processing is then repeated. If, however, the image is of sufficient quality, it can be saved and displayed for use, as depicted at block 560.

If the maximum rows has not been exceeded as detected in decision block 512, then another test can be performed, as illustrated at decision block 514, to determine if the column maximum has been exceeded. If so, then the row variable can be incremented and the column variable can be reset to one at function block 518 and control flows to input block 520. If the column maximum has not been exceeded, then the column variable may be incremented and the sub-image sample frame can be retrieved, as depicted at input block 520. Then, as illustrated at function block 530, the frame may be inserted correctly in the overview image.

The frame may be inserted at the location corresponding to $(V_{sub}*row*col)+H_{sub}*col$; where row and col refer to the variables incremented in the nested loop, and $V_{sub}$ and $H_{sub}$ are user specified variables corresponding to the horizontal and vertical sub sampling rate. Finally, the incremental overview image can be displayed based on the newly inserted frame as depicted at display block 540. Thereafter, the column variable can be reset to one and processing can be passed to decision block 512.

A computer system corresponding to the prior art method and system depicted in FIGS. 11 to 17 may be generally interactive. A user may guess at some set of parameters, build the overview image, and decide if the image is satisfactory. If the image is not satisfactory, then variables can be adjusted and the image is recreated. This process can be repeated until a satisfactory image results, which may be saved with its associated parameters. The picture and the parameters can be then input to the next set of logic.

Such features may or may not be present with the hand held device itself. For example, images may be transmitted from a transmitter, such as data transmitter 112 of FIG. 7, and subroutines or routines present within the server itself may utilize predetermined sets of parameters to build the overview image and determine if the image is satisfactory, generally at the request of the hand held device user. A satisfactory image can be then transmitted to the hand held device. Alternatively, image-processing routines present within an image-processing unit integrated with the hand held device may operate in association with routines present within the server to determine if the image is satisfactory, and/or to manipulate the image (e.g., pan, zoom).

Figure 17:
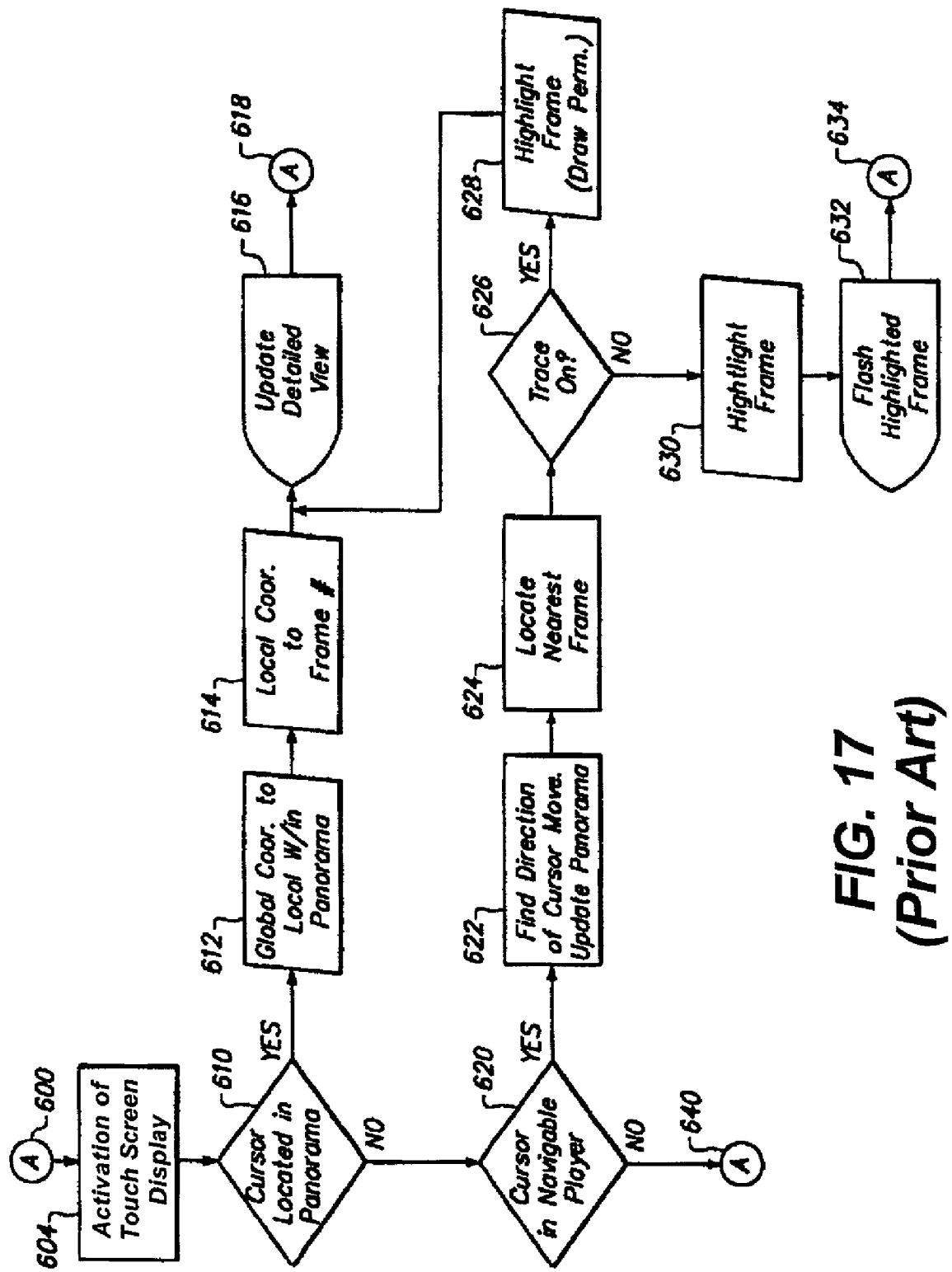
FIG. 17 illustrates a prior art flowchart illustrative of a logical process for playback interaction, which may be utilized in accordance with embodiments of the present invention.
Figure 18:
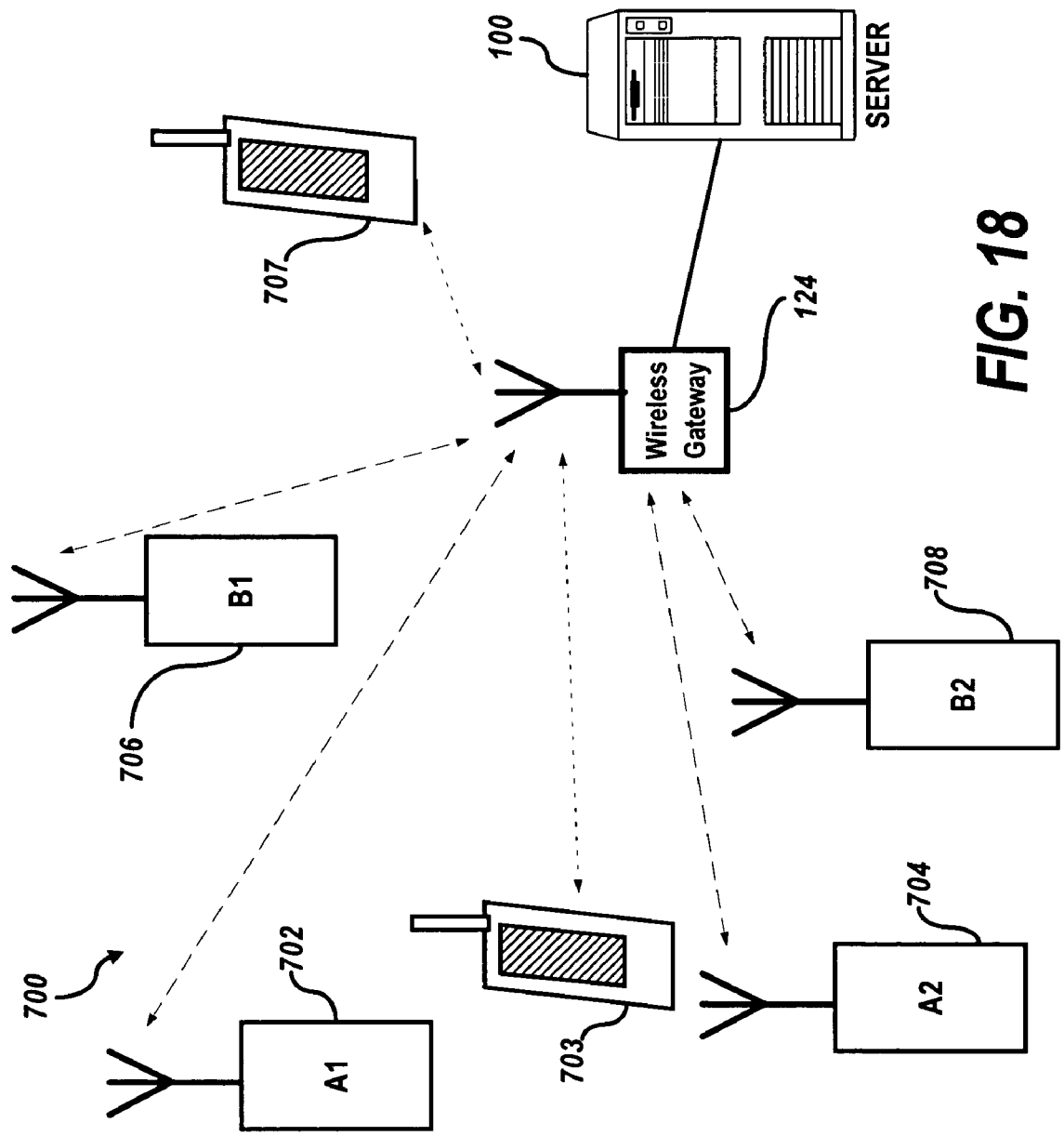
FIG. 18 depicts a pictorial representation illustrative of a Venue Positioning System (VPS) in accordance with preferred embodiments of the present invention.

FIG. 17 depicts a prior art flowchart illustrative of a logical process for playback interaction. The logical process illustrated in FIG. 17 may be utilized in accordance with preferred embodiments of the present invention. Playback interaction may commence, as illustrated at label 600, which immediately flows into function block 604 to detect if user controls have been activated at the hand held device. Such user controls may be configured as external user controls on the hand held device itself (e.g., buttons, etc.), or via a touch screen user interface integrated with hand held device display screen.

When a touch screen user input or user control button press is detected, a test can be performed to determine if a cursor is positioned in the overview portion of the display. If so, then the global coordinates can be converted to overview image coordinates local to the overview image as shown in output block 612. The local coordinates can be subsequently converted into a particular frame number as shown in output block 614. Then, the overview image is updated by displaying the frame associated with the particular location in the overview image and control flows via label 600 to function block 604 to await the next button press.

If the cursor is not detected in the overview image as illustrated at decision block 610, then another test may be performed, as indicated at decision block 620, to determine if the cursor is located in the navigable player (detail window). If not, then control can be passed back via label 600 to function block 604 to await the next user input. However, if the cursor is located in the detail window, then as depicted a function block 622, the direction of cursor movement may be detected. As depicted at function block 624, the nearest frame can be located, and as illustrated at decision block 626, trace mode may be tested.

If trace is on, then a geometric figure can be displayed at the location corresponding to the new cursor location in the overview image. The overview image may be then updated, and control can be passed back to await the next user input via user controls at the hand held device and/or a touch screen user interface integrated with the hand held device. If trace is not on, the particular frame is still highlighted as shown in function block 630, and the highlight can be flashed on the overview image as illustrated at output block 632. Thereafter, control may be returned to await the next user input.

Although the aforementioned logical processes describe the use of a cursor as a means for detecting locations in a panorama, those skilled in the art can appreciate that other detection and tracking mechanisms may be utilized, such as, for example, the pressing of a particular area within a touch screen display.

Figure 19:
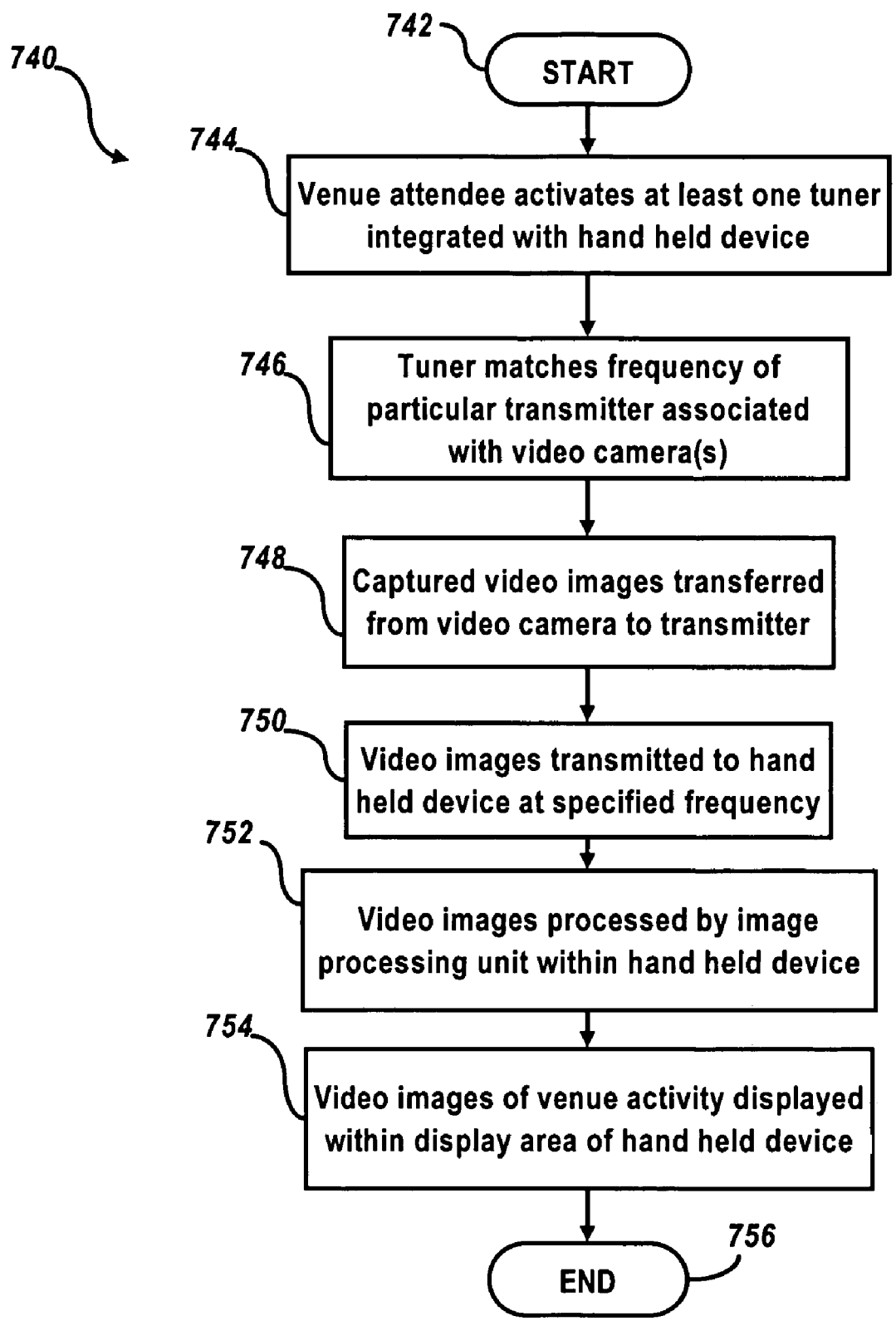
FIG. 19 depicts a flowchart of operations illustrative of a method for providing multiple venue activities through a hand held device in accordance with preferred embodiments of the present invention.

FIG. 19 depicts a pictorial representation illustrative of a Venue Positioning System (VPS) 700 in accordance with preferred embodiments of the present invention. Stadium venue may be utilized for sports activities, concert activities, political rallies, or other venue activities. Such a stadium venue can be divided, for example, into a variety of seating sections A to N. For purposes of simplifying this discussion, VPS 700 is described in the context of sections A to C only.

A venue positioning system (VPS) device 704 is positioned in section A of stadium venue 701, as indicated at position A2. A VPS device 702 is located within section A at position A1. In the illustration of FIG. 19, it is assumed that VPS device 702 is located at the top of a staircase, while VPS device 704 is located at the bottom of the staircase, and therefore at the bottom of section A, near the sports field 711. A VPS device 706 is located near the top of section B at position B1. A VPS device 708 is located at the bottom of section B at position B2, near sports field. Similarly, in section C, other venue-positioning devices can be respectively located at positions C1 and C2.

A hand held device 703 may be located at a seat within section A. For purposes of this discussion, and by way of example only, it is assumed that hand held device 703 is being operated by a stadium attendee watching a sporting event or other venue activity taking place on the sports field. A hand held device 707 is located within section B. Hand held device 707, by way of example, may also be operated by a concessionaire or venue employee.

If the user of hand held device 703 desires to order a soda, hot dog, or other product or service offered by venue operators during the venue event, the user merely presses an associated button displayed via a touch screen user interface integrated with the hand held device. A signal is transmitted by hand held device 703, in response to the user input to/through the VPS device, wireless network or wireless gateway as previously described. One or more of VPS devices 702, 704, 706, and 708 may detect the signal. The VPS devices may also operate merely as transponders, in which case hand held devices will be able to determine their approximate location within the venue and then transmit position information through wireless means to, for example, concession personnel.

VPS devices 702, 704, 706, and 708 function in concert with one another to determine the location of hand held device 703 within section A. Triangulation methods, for example, may be used through the hand held device or VPS devices to determine the location of the hand held device within the venue. This information is then transmitted by one or more of such VPS devices either directly to hand held device 707 or initially through a wireless network, including a wireless gateway and associated server, and then to hand held device 707. The user of hand held device 707 then can directly proceed to the location of hand held device 703 to offer concession services.

Additionally, hand held device 703 can be configured with a venue menu or merchandise list. In response to requesting a particular item from the menu or merchandise list, the request can be transmitted as wireless data from hand held device 703 through the wireless network to hand held device 707 (or directly to a controller (not shown) of hand held device 707) so that the user (concession employee) of hand held device 707 can respond to the customer request and proceed directly to the location of hand held device 703 used by a customer.

Additionally wireless gateway 124 and server 100 of FIG. 19 are analogous to the wireless gateway 124 and server 100 illustrated in FIG. 8. Venue positioning units 702, 704, 706, and 708 are located within section A and section B. A wireless gateway 124 is linked to server 100. Wireless gateway 124 can communicate with hand held device 707 and hand held device 703.

Wireless gateway 124 can also communicate with VPS devices 702, 704, 706, and 708 if the VPS devices are also operating as data communication devices in addition to providing mere transponder capabilities. When VPS devices 702, 704, 706, and 708 detect the location of hand held device 703 within the stadium venue, the location is transmitted to wireless gateway 124 and thereafter to hand held device 703. It should be appreciated that a hand held device user may also identify his/her location in a venue by entering location information (e.g., seat/section/row) on the hand held device when making a request to a service provider such as a food concession operation. The VPS devices will still be useful to help concession management locate concession employees located within the venue that are in closest proximity to the hand held device user. A wireless gateway 124 and server 100 can be associated with a wireless network implemented in association with the stadium venue. Those skilled in the art will appreciate that such a wireless network may be limited geographically to the stadium venue itself and the immediate surrounding area. An example of such a wireless network, as described previously is a Bluetooth based wireless network.

The hand held devices themselves may be proprietary devices owned by promoters or operators of stadium venue 701 and rented to patrons for their use while attending a venue activity. Proprietary devices will generally be manufactured using durable materials (e.g., similar to those materials used on field technician digital multimeters/devices such as the Fluke™ line of electronic devices). Proprietary devices will also be limited in hardware and software modules (i.e., software routines/subroutines) needed for communication with the venue system in order to display venue activities to temporary users.

Hand held devices may also be owned by the patrons themselves that they bring into the stadium venue for their use by permission of the venue promoter or stadium owners in return for the payment of a fee by the patron. In return for the fee, the venue promoter or stadium owner can provide the patron with a temporary code, which permits them to access, the wireless transmissions network and associated with the venue itself, such as wireless network 152 described herein. Patron-owned devices may utilize modules (e.g., smart card technology to receive authorization (e.g., frequency or codes) needed to receive venue-provided video/data. Authorization may also be transferred to the patron-owned device via IR or short-range RF means. Wireless network 152 described herein may be configured as a proprietary wireless Intranet/Internet providing other data accessible by patrons through their hand held devices.

FIG. 19 depicts a flowchart of operations 740 illustrative of a method for providing multiple venue activities through a hand held device, in accordance with preferred embodiments of the present invention. The process is initiated, as depicted at block 742. As illustrated next at block 744, a venue attendee may activate at least one hand held tuner integrated with a hand held device, such as the hand held device illustrated in FIG. 4. At least one tuner may be integrated with the hand held device, although more than one tuner (or other simultaneous signal receiving capability) may be used within a hand held device in support of other embodiments of the invention previously described.

The tuner, or tuners, is/are associated with a transmission frequency/frequencies of a transmitter that may be linked to a particular camera/cameras focusing on a venue activity, or to a wireless gateway or wireless network transmission. To view images from a particular angle, the user can retrieve the video images from the camera associated with that particular perspective. The user may have to adjust a tuner until the right frequency/image is matched, as indicated at block 756. As illustrated at block 748, captured video images are transferred from the video camera to the transmitter associated with the camera, or a server in control of the camera(s). Video images are thus generally transmitted to the hand held device at the specified frequency, either in response to a user request at the hand held device, as depicted at block 750 or as a broadcast.

An image-processing unit integrated with the hand held device, as illustrated at block 752 may process transferred video images. An example of such an image-processing unit is image-processing unit 35 of FIG. 1. As indicated thereafter at block 754, the video images of the venue activity captured by the video camera can be displayed within a display area of the hand held device, such as display 18 of FIG. 1. The process can then terminate, as illustrated at block 756 when the user no longer desires to view the perspective.

Figure 20:
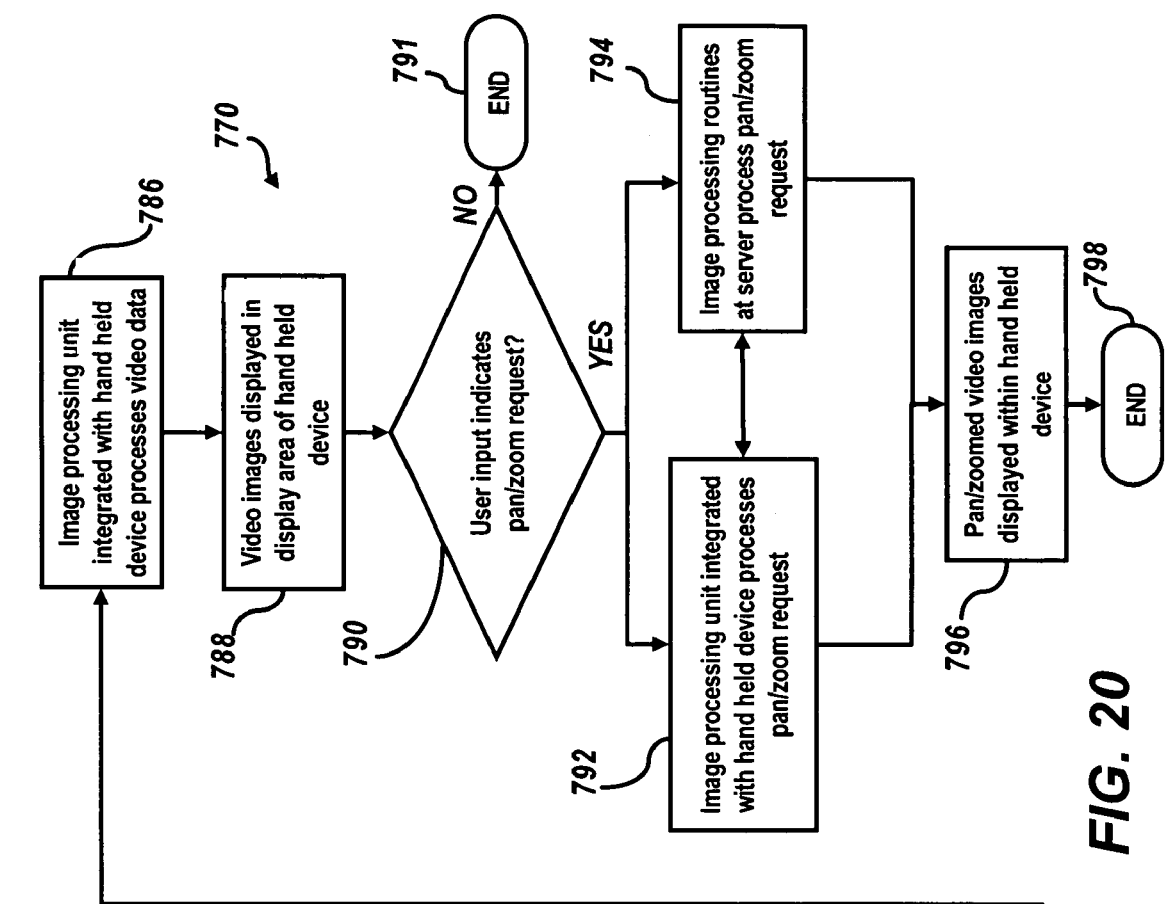
FIG. 20 illustrates a flowchart of operations illustrative of a method for providing multiple venue activities through a hand held device from one or more digital video cameras in accordance with preferred embodiments of the present invention.
Figure 20:
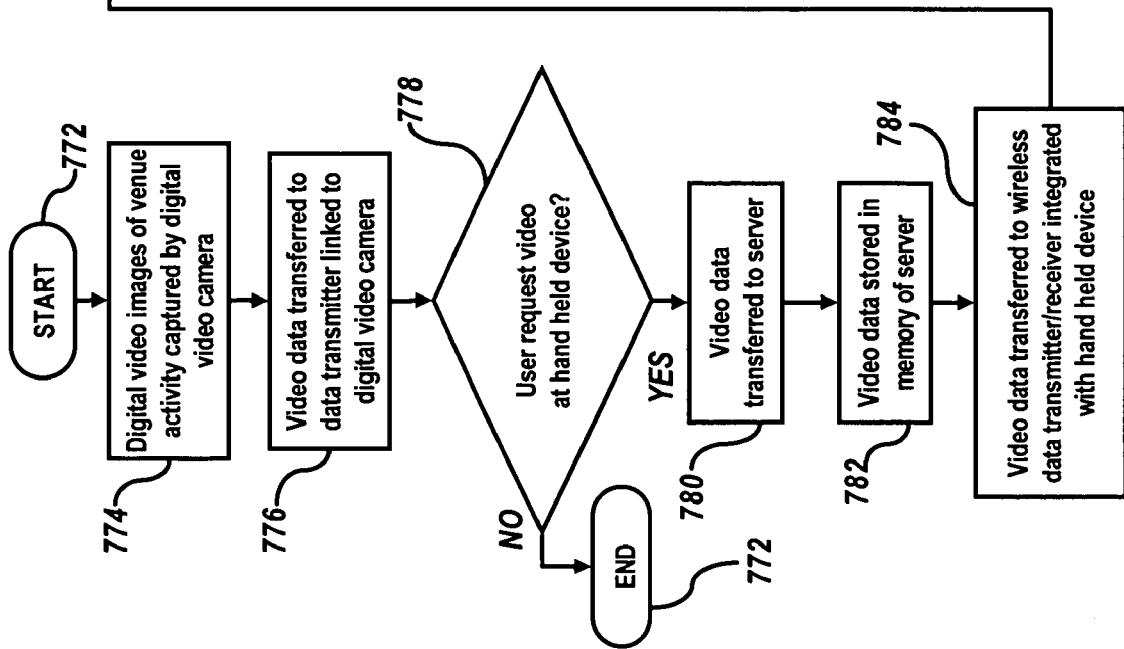

FIG. 20 illustrates a flowchart of operations 770 illustrative of a method for providing multiple venue activities through a hand held device from one or more digital video cameras, in accordance with preferred embodiments of the present invention. When a user of a hand held device can interact with the venue system, as indicated at block 772, the process is initiated. As illustrated next at block 774, video images of a venue activity may be captured by one or more digital video cameras.

Such digital video cameras may be panoramic/wide-angle in nature and/or configured as high definition/resolution video cameras, well known in the art. The video camera or cameras may be respectively linked to data transmitters, such as data transmitters 102, 104, 106, and/or 108 of FIG. 5 or data transmitter 112 of FIG. 6 to FIG. 9 herein. As depicted next at decision block 778, if a user does not request a view of the venue activity through the hand held device, the process terminates (i.e., with respect to that use), as illustrated thereafter at block 779.

If, as illustrated at decision block 778, the user can request a view of the venue activity through the hand held device, then as described thereafter at block 780, video data may be transferred from a data transmitter to a server, such as server 100 of FIG. 5 to FIG. 8 herein. The video data may be stored in a memory location of the server or a plurality of servers, as indicated at block 782. The video data may be then transferred to a wireless data transmitter/receiver integrated with the hand held device, as indicated at block 784.

As illustrated thereafter at block 786, the video data may be processed by an image-processing unit and associated image-processing routines and/or subroutines integrated with the hand held device. When image processing is complete, the video images may be displayed in a display area of the hand held device. As illustrated next at block 790, if a user chooses to pan/zoom for a better view of the video images displayed within the hand held device, then two possible operations may follow, either separately or in association with one another.

The image-processing unit integrated with the hand held device may process a user's pan/zoom request, as illustrated at block 792. Alternatively, image-processing routines and/or subroutines resident at the server or a plurality of servers may process the user's pan/zoom request, following the transmission of the user's request from the hand held device to the server or plurality of servers. Such a request may be transmitted through a wireless gateway linked to the server or servers.

Image processing may occur at the server or servers if the hand held device is not capable of directly processing the video data and video images thereof due to low memory or slow CPU allocation. Likewise, some image-processing may take place within the hand held device, while video image-processing requiring faster processing capabilities and increased memory may take place additionally at the server or servers to assist in the final image representation displayed at the hand held device.

When image processing is complete, the pan/zoomed images can be displayed within a display screen or display area of the hand held device, as illustrated thereafter at block 796. The process then terminates, as depicted at block 798. If the user does not request pan/zoom, as indicated at block 790, the process may then terminate, as described at block 791.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

The invention claimed is:

1. A method for providing venue-based data to hand held devices, said method comprising the steps of:
    capturing video images from more than one perspective of a venue-based activity using more than one video camera located at a sports and entertainment venue;
    providing said video images to a server to process said more than one video perspective captured by more than one video camera into venue-based data formatted for wireless transmission via wireless data networks to more than one hand held device, each of said more than one hand held device further comprising at least one of a personal digital assistant and a smart phone, said more than one hand held device including at least one 802.11 wireless module for access to a wireless local area network and a cellular communications module for communication with a wireless cellular communications network, said more than one hand held device further comprising a touch-sensitive display screen to simultaneously and singularly display said venue-based data and to accept user input via said touch-sensitive display screen; and
    retrieving said venue-based data from said server and wirelessly transmitting said venue-based data to at least one hand held device located at said sports and entertainment venue over said wireless local area network and also wirelessly transmitting said venue-based data to at least one hand held device located outside of said sports and entertainment venue over said wireless cellular communications network.

2. The method of claim 1 further comprising the step of:
providing said at least one hand held device as a hand held device adapted for use with a software module that contains access codes that permit said at least one hand held device located at said sports and entertainment venue to receive venue-based data over said local wireless network and display said venue-based data.

3. The method of claim 1 further comprising the steps of:
receiving said venue-based data at said least one hand held device from at least one of said wireless local area network or said wireless cellular communications network;
processing said data to provide more than one video perspective for simultaneous display on said touch-sensitive display screen associated with said at least one hand held device, in response to receiving said data at said at least one hand held device; and
simultaneously displaying more than one video perspective on said touch-sensitive display screen, thereby enabling a user of said at least one hand held device to view more than one video perspective at a time through said at least one hand held device.

4. The method of claim 3 wherein the step of displaying said processed data including more than one video perspective on said touch-sensitive display screen, further comprises the step of:
displaying said processed data on said touch-sensitive display screen, in response to user input through a user interface associated with said touch sensitive display screen; and
displaying a single video perspective on said touch-sensitive display screen following a user selection of the single video perspective at said user interface.

5. The method of claim 1 wherein said at least one video camera is adapted to provide high-resolution wide-angle video data.

6. The method of claim 1, wherein said wirelessly transmitting said venue-based data to at least one hand held device located outside of said sports and entertainment venue over a wireless cellular communications network further comprises providing said venue-based data from said server to said at least one hand held device located at or outside of said sports and entertainment venue through said wireless cellular communications network, wherein said wireless cellular communications network comprises a CDMA wireless communications network.

7. The method of claim 1 further comprising the step of:
transmitting said venue-based data from said at least one venue-based data source to said at least one hand held device located at said sports and entertainment venue through more than one wireless gateway associated with said a wireless local area network also located at said sports and entertainment venue.

8. The method of claim 7 further comprising the step of:
transferring said data through a wireless gateway associated with said wireless local area network.

9. The method of claim 1 further comprising the step of:
processing said data for display on said touch-sensitive display screen associated with said at least one hand held device utilizing at least one image-processing module.

10. The method of claim 1 wherein said venue-based data further comprises at least one of team data, venue information, statistics, merchandise information, concession information, advertisements, scores, charts, promotional information, propaganda, and scheduling, instant video replays.

11. The method of claim 1 wherein said venue-based data further comprises instant replay video data.

12. The method of claim 1 wherein said venue-based data further comprises promotional information.

13. The method of claim 1 wherein said venue-based data further comprises venue and team information.

14. A method for wirelessly transmitting venue-based data to hand held devices located within and outside of a sports and entertainment venue, said method comprising the steps of:
capturing video images from more than one perspective of a venue-based activity using more than one video camera located at a sports and entertainment venue;
providing said video images to a server to process said more than one video perspective captured by more than one video camera into venue-based data formatted for wireless transmission via wireless data networks to more than one hand held device, each of said more than one hand held device further comprising at least one of a personal digital assistant and a smart phone, said more than one hand held device including at least one 802.11 wireless module for access to a wireless local area network and a cellular communications module for communication with a wireless cellular communications network, said more than one hand held device further comprising a touch-sensitive display screen to simultaneously and singularly display said venue-based data and to accept user input via said touch-sensitive display screen;
wirelessly transmitting venue-based data including video captured from multiple perspective by cameras located at said a sports and entertainment venue to at least one hand held device among said more than one hand held device located at said sports and entertainment venue over said wireless local area network from said server;
wirelessly transmitting said venue-based data to at least one hand held device among said more than one hand held device located at or outside of said sports and entertainment venue over said wireless a cellular communications network; and
processing said venue-based data received by said more than one hand held device to provide processed data including more than one video perspective for display on said touch-sensitive display screen associated with said more than one hand held device; and
displaying at least one video perspective processed as data on said touch-sensitive display screen of said more than one hand held device.

15. A method for displaying a particular perspective of a venue-based activity at least one authorized hand held device having a display screen, said method comprising the steps of:
simultaneously capturing a plurality of video perspectives of a venue-based activity utilizing more than one camera located at a sports and entertainment venue;
processing said plurality of video perspectives at a server into encrypted video data packet for display on a touch-sensitive display screen associated with said at least one authorized hand held device provided in the form of at least a smart phone or personal digital assistance, said at least one hand held device further comprising at least one 802.11 wireless module for access to a wireless local area network and a cellular communications module for communication with a wireless cellular communications network;
wirelessly transmitting said encrypted video packet over an 802.11 wireless local area network to said at least one authorized hand held device said plurality of video perspectives of a venue-based activity from said server;
processing said plurality of video perspectives at said at least one authorized hand held device into decrypted video data packet for display on said touch-sensitive display screen associated with said at least one authorized hand held device; and displaying a particular video perspective on said touch-sensitive display screen, in response to a user selection of said particular video perspective from among said plurality of video perspectives.

16. An entertainment venue multimedia system configured with a data processing system and wireless infrastructure for providing venue-based data to authorized hand held devices located within and outside of an entertainment venue via data communication networks including cellular communications and local wireless networking capabilities, said multimedia system comprising:

more than one venue-based camera capturing a different video perspective within an entertainment venue;

a server receiving and processing more than one video perspective received from said more than one venue-based camera;

wireless data communication networks including a wireless local area network and a wireless cellular communications network in communication with said server, said wireless data communication networks accessing and transmitting said more than one video perspective from said server to more than one hand held device; and at least one hand held device in secure communications with said server, said at least one hand held device each further comprising at least one of a personal digital assistant and a smart phone and said more than one hand held device including at least one 802.11 wireless module for access to a wireless local area network and a cellular communications module for communication with a wireless cellular communications network, said more than one hand held device further comprising a touch-sensitive display screen to display venue-based data including simultaneously and singularly displaying video perspectives from said more than one venue-based camera and to accept user input via said touch-sensitive display screen;

wherein said system wirelessly transmits venue-based data including video from said more than one venue-based camera from said server to said at least one hand held device located in said entertainment venue over a wireless local area network and said system is also wirelessly transmits said venue-based data including video from said more than one venue-based camera from said server to hand held devices located outside of said sports and entertainment venue over a wireless cellular communications network.

17. The system of claim 16, said at least one personal digital assistant including cellular communications and local wireless networking capabilities further comprising a removable module that contains at least one of electronics or access codes that permit said at least one authorized personal digital assistant including cellular communications and local wireless networking capabilities to receive said video perspectives transmitted by said server.

18. The system of claim 17 wherein said removable module comprises a smart card.

19. The system of claim 17 wherein said module comprises a removable cartridge that provides decryption codes to enable said at least one authorized personal digital assistant including cellular communications and local wireless networking capabilities to receive video perspectives from said server, if said video perspectives are encrypted.

20. The system of claim 17 wherein said removable module further comprises a plurality of tuners integrated with said at least one authorized personal digital assistant including cellular communications and local wireless networking capabilities, wherein said plurality of tuners are activated by at least one authorized personal digital assistant including cellular communications and local wireless networking capabilities to receive video perspectives transmitted from said server for display at said touch-sensitive display screen associated with the at least one authorized personal digital assistant including cellular communications and local wireless networking capabilities.

* * * * *